US009148667B2

(12) United States Patent
Chien et al.

(10) Patent No.: US 9,148,667 B2
(45) Date of Patent: Sep. 29, 2015

(54) INTRA PREDICTION MODE DECISION WITH REDUCED STORAGE

(71) Applicant: QUALCOMM Incorporated, San Diego, CA (US)

(72) Inventors: Wei-Jung Chien, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 13/760,750

(22) Filed: Feb. 6, 2013

(65) Prior Publication Data

US 2014/0219349 A1 Aug. 7, 2014

(51) Int. Cl.

| H04N 7/12 | (2006.01) |
|---|---|
| H04N 19/105 | (2014.01) |
| H04N 19/176 | (2014.01) |
| H04N 19/147 | (2014.01) |
| H04N 19/11 | (2014.01) |
| H04N 19/19 | (2014.01) |
| H04N 19/433 | (2014.01) |
| H04N 19/436 | (2014.01) |

(52) U.S. Cl.
CPC ............ *H04N 19/105* (2014.11); *H04N 19/11* (2014.11); *H04N 19/147* (2014.11); *H04N 19/176* (2014.11); *H04N 19/19* (2014.11); *H04N 19/433* (2014.11); *H04N 19/436* (2014.11)

(58) Field of Classification Search
USPC .................................................. 375/240.13
See application file for complete search history.

(56) References Cited

U.S. PATENT DOCUMENTS

| 2007/0036215 | A1 | 2/2007 | Pan et al. | |
|---|---|---|---|---|
| 2009/0060045 | A1* | 3/2009 | Tateno | 375/240.16 |
| 2009/0161757 | A1 | 6/2009 | Yu et al. | |
| 2010/0220790 | A1* | 9/2010 | Jeon et al. | 375/240.16 |
| 2010/0309977 | A1* | 12/2010 | Andersson et al. | 375/240.12 |

(Continued)

FOREIGN PATENT DOCUMENTS

EP 1808024 A1 7/2007

OTHER PUBLICATIONS

Second Written Opinion from corresponding PCT Application No. PCT/US2014/010345 dated Feb. 20, 2015 (5 pages).

(Continued)

*Primary Examiner* — David J. Czekaj
*Assistant Examiner* — Tracy Li
(74) *Attorney, Agent, or Firm* — Shumaker & Sieffert, P.A.

(57) ABSTRACT

In general, techniques are described for reducing the space required to store rate distortion values when selecting from multiple, different prediction modes. A video coding device comprising a processor may perform the techniques. The processor may determine first and second sets of intra-prediction modes for a current block of video data. The first and second sets of intra-prediction modes may include less intra-prediction modes, collectively, than a total number of intra-prediction modes. The processor may compute an approximate cost for each intra-prediction mode included in the first and second sets of intra-prediction modes. The processor may store the approximate cost for each intra-prediction mode identified in the first and second sets of intra-prediction modes to a memory. The processor may perform intra-prediction to encode the current block using a mode identified in at least one of the first or second set.

36 Claims, 8 Drawing Sheets

(56) References Cited

U.S. PATENT DOCUMENTS

| | | | |
|---|---|---|---|
| 2010/0329342 | A1 | 12/2010 | Joshi et al. |
| 2011/0110425 | A1 | 5/2011 | Zhang |
| 2011/0158314 | A1 | 6/2011 | Jeong et al. |
| 2011/0176608 | A1 | 7/2011 | Kim et al. |
| 2012/0106636 | A1 | 5/2012 | Kim et al. |
| 2012/0170652 | A1 | 7/2012 | Guo et al. |
| 2012/0177118 | A1 | 7/2012 | Karczewicz et al. |
| 2012/0224777 | A1 | 9/2012 | Kim et al. |
| 2013/0101232 | A1* | 4/2013 | Cohen et al. ............ 382/233 |
| 2014/0219342 | A1 | 8/2014 | Yu et al. |

OTHER PUBLICATIONS

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "High efficiency video coding (HEVC) text specification draft 9," Joint Collaborative Team on Video Coding, JCTVC-K1003_v7, Oct. 10-19, 2012, 290 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

International Telecommunication Union, "Advanced video coding for generic audiovisual services," Standardization Sector of ITU, Jun. 2011, 674 pp.

Richardson, "White Paper: H.264 / AVC Intra Prediction," Vcodex, 2002-2011, 7 pp.

U.S. Appl. No. 13/756,659, by Yang Yu, filed Feb. 1, 2013.

Wiegand et al., "WD2: Working Draft 2 of High-Efficiency Video Coding", Joint Collaborative Team on Video Coding, JCTVC-D503, Jan. 20-28, 2011, 153 pp.

Wiegand et al., "WD3: Working Draft 3 of High-Efficiency Video Coding," Joint Collaborative Team on Video Coding, JCTVC-E603, Mar. 16-23, 2011, 193 pp.

Wiegand et al., "WD1: Working Draft 1 of High-Efficiency Video Coding", Joint Collaborative Team on Video Coding, JCTVC-C403, Oct. 7-15, 2010, 137 pp.

Ahmad et al., "Video compression with parallel processing," Parallel Computing, Elsevier Publishers, Amsterdam, NL, vol. 28, No. 7-8, XP004375033, ISSN: 0167-8191, Apr. 1, 2001, 40 pp.

Bross et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

International Search Report and Written Opinion—PCT/US2014/010345—ISA/EPO—Apr. 16, 2014, 15 pp.

Pan et al., "Fast Mode Decision Algorithm for Intraprediction in H.264/AVC Video Coding," IEEE Transactions on Circuits and Systems for Video Technology, IEEE, vol. 15, No. 7, Jul. 2005, 10 pp.

Motra et al., "Fast Intra Mode Decision for HEVC Video Encoder," 2012 20th International Conference on Software, Telecommunications and Computer Networks (SOFTCOM), IEEE, Sep. 11-13, 2012, 5 pp.

Sarwer et al., "Enhanced Low Complex Cost Function for H.264/AVC Intra Mode Decision," 2011 International Conference on Multimedia and Signal Processing (CMSP), IEEE, May 14-15, 2011, 5 pp.

Sarwer et al., "Fast sum of absolute transformed difference based 4x4 intra-mode decision of H.264/AVC video coding standard," Signal Processing: Image Communication, vol. 23, Elsevier Science Publishers, May 5, 2008, 10 pp.

Zhang et al., "Fast Intra Prediction for High Efficiency Video Coding," Advances in Multimedia Information Processing—PCM 2012, Lecture Notes in Computer Science, vol. 7674, Dec. 4-6, 2012, 10 pp.

Zhao et al., "Fast mode decision algorithm for intra prediction in HEVC," Visual Communications and Image Processing (VCIP), 2011 IEEE, Nov. 6-9, 2011, 4 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Response to Written Opinion mailed Apr. 16, 2014, from international application No. PCT/US2014/010345, dated Nov. 17, 2014, 34 pp.

International Preliminary Report on Patentability from corresponding PCT Application Serial No. PCT/US2014/010345 dated May 13, 2015 (33 pages).

* cited by examiner

INTRA PREDICTION MODE DECISION WITH REDUCED STORAGE

TECHNICAL FIELD

This disclosure relates to video coding and, more particularly, intra-prediction aspects of video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), and extensions of such standards, to transmit and receive digital video information more efficiently. New video coding standards, such as the High Efficiency Video Coding (HEVC) standard being developed by the "Joint Collaborative Team-Video Coding" (JCT-VC), which is a collaboration between MPEG and ITU-T, are being developed. The emerging HEVC standard is sometimes referred to as H.265, although such a designation has not formally been made.

SUMMARY

In general, this disclosure describes techniques for reducing the space required to store rate distortion values when selecting from multiple, different prediction modes. Generally, a video coder may code blocks of a picture using intra-mode encoding (e.g., encoded relative to other blocks of the same picture) or inter-mode encoding (e.g., encoded relative to blocks of a previously coded picture). In some examples, a video coder may select a mode to code a given block from a large number of different modes. The video coder may select the mode based on a corresponding approximate cost value that represents an approximate rate of distortion for the selected mode. Rather than storing approximate cost values for each possible prediction mode, the video coder may store approximate cost values for a subset of the all the possible prediction modes. Since the total number prediction modes specified the subset is less than the total number of all possible prediction modes, the techniques of the disclosure may reduce the amount of on-chip memory required to store these approximate cost values. In some examples, reducing on-chip memory requirements may improve video coding performance in parallel- and/or serial-processing video coders.

In one embodiment, a method includes determining a first set of intra-prediction modes for a current block of the video data to be encoded. The first set of intra-prediction modes may include less intra-prediction modes than a total number of intra-prediction modes capable of being used to encode the current block. The method may further include determining a second set of intra-prediction modes for the current block in addition to the first predefined set of intra-prediction modes. The second set of intra-prediction modes includes a quantity of intra-prediction modes less than or equal to the total number of intra-prediction modes capable of being used to encode the current block. Both the first set and the second set may collectively include less intra-prediction modes in total than the total number of intra-prediction modes capable of being used to encode the current block. The method may further include computing an approximate cost for each intra-prediction mode included in the first set of intra-prediction modes and each intra-prediction mode included in the second set of intra-prediction modes. The approximate cost may approximate a rate distortion cost of encoding the current block of video data using the corresponding one of the intra-prediction modes. The method may also include storing the approximate cost for each intra-prediction mode identified in the first set of intra-prediction modes and for each intra-prediction mode identified in the second set of intra-prediction modes to a memory. The method may further include performing intra-prediction to encode the current block in accordance with one of the intra-prediction modes identified by the first set of intra-prediction modes or the second set of intra-prediction modes based on the approximate cost computed for each intra-prediction mode identified in the first set of intra-prediction modes and the second set of intra-prediction modes.

In one embodiment, a video coding device configured to perform an intra-prediction process to code video data may include a processor configured to determine a first set of intra-prediction modes for a current block of the video data to be encoded. The first set of intra-prediction modes may include less intra-prediction modes than a total number of intra-prediction modes capable of being used to encode the current block. The video coding device may also be configured to determine a second set of intra-prediction modes for the current block in addition to the first predefined set of intra-prediction modes. The second set of intra-prediction modes may include a quantity of intra-prediction modes less than or equal to the total number of intra-prediction modes capable of being used to encode the current block. Both the first set and the second set collectively may include less intra-prediction modes in total than the total number of intra-prediction modes capable of being used to encode the current block. The video coding device may also be configured to compute an approximate cost for each intra-prediction mode included in the first set of intra-prediction modes and each intra-prediction mode included in the second set of intra-prediction modes. The approximate cost may approximate a rate distortion cost of encoding the current block of video data using the corresponding one of the intra-prediction modes. The video coding device may also be configured to store the approximate cost for each intra-prediction mode identified in the first set of intra-prediction modes and for each intra-prediction mode identified in the second set of intra-prediction modes to a memory. The video coding device may also be configured to perform intra-prediction to encode the current block in accordance with one of the intra-prediction modes identified by the first set of intra-prediction modes or the second set of intra-prediction modes based on the approximate cost computed for each intra-prediction mode identified in the first set of intra-prediction modes and the second set of intra-prediction modes.

In one embodiment, a video coding device configured to perform an intra-prediction process to code video data includes means for determining a first set of intra-prediction modes for a current block of the video data to be encoded. The first set of intra-prediction modes may include less intra-prediction modes than a total number of intra-prediction modes capable of being used to encode the current block. The video coding device may also includes means for determining a second set of intra-prediction modes for the current block in addition to the first predefined set of intra-prediction modes. The second set of intra-prediction modes may include a quantity of intra-prediction modes less than or equal to the total number of intra-prediction modes capable of being used to encode the current block. Both the first set and the second set collectively may include less intra-prediction modes in total than the total number of intra-prediction modes capable of being used to encode the current block. The video coding device may further include means for computing an approximate cost for each intra-prediction mode included in the first set of intra-prediction modes and each intra-prediction mode included in the second set of intra-prediction modes. The approximate cost may approximate a rate distortion cost of encoding the current block of video data using the corresponding one of the intra-prediction modes. The video coding device may also include means for storing the approximate cost for each intra-prediction mode identified in the first set of intra-prediction modes and for each intra-prediction mode identified in the second set of intra-prediction modes to a memory. The video coding device may further include means for performing intra-prediction to encode the current block in accordance with one of the intra-prediction modes identified by the first set of intra-prediction modes or the second set of intra-prediction modes based on the approximate cost computed for each intra-prediction mode identified in the first set of intra-prediction modes and the second set of intra-prediction modes.

The details of one or more examples are set forth in the accompanying drawings and the description below. Other features, objects, and advantages will be apparent from the description and drawings, and from the claims.

DETAILED DESCRIPTION

Figure 1:
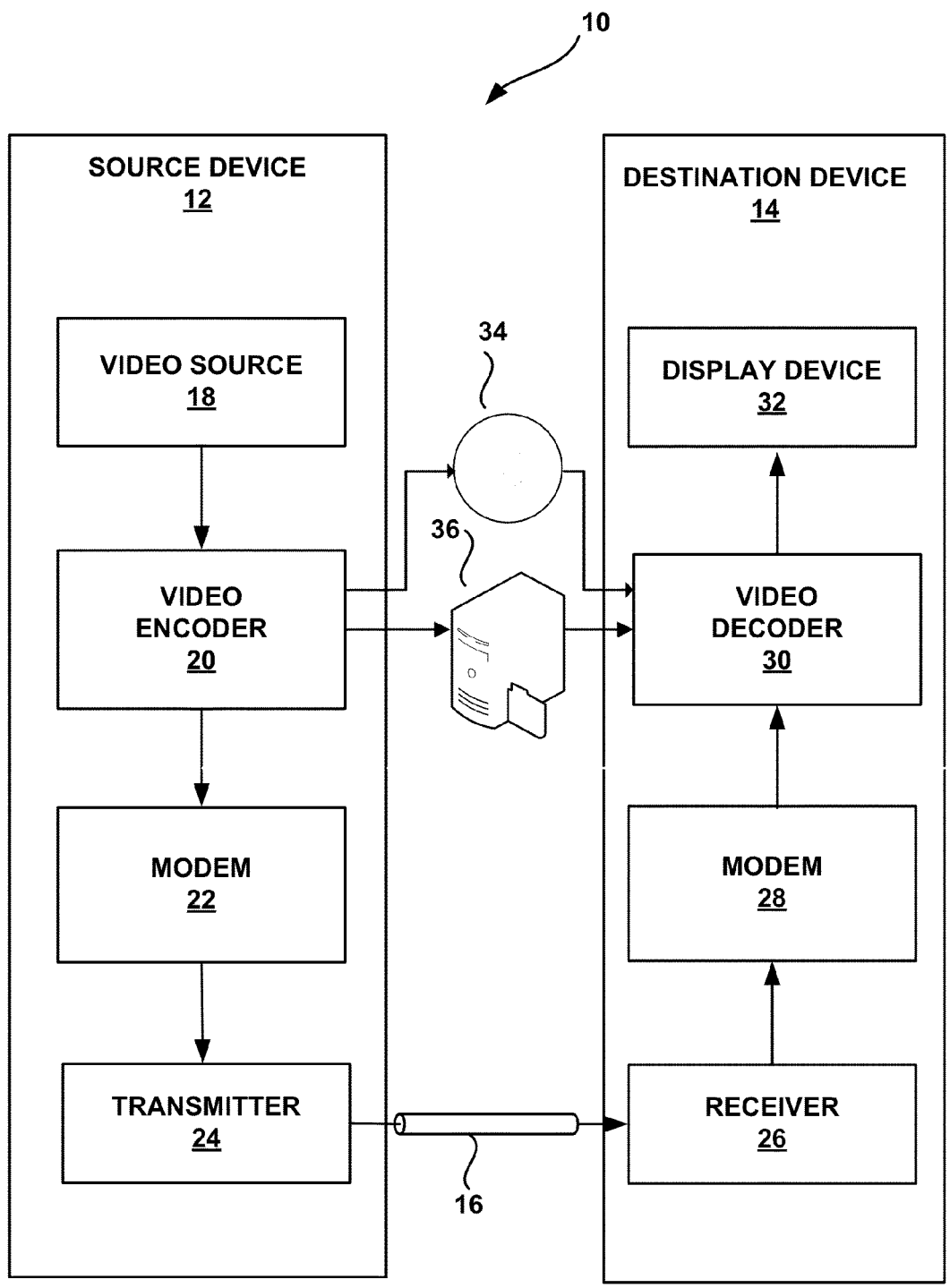
FIG. 1 is a block diagram illustrating an example video encoding and decoding system that may be configured to utilize the techniques described in this disclosure for reducing the space required to store rate distortion values when selecting from multiple, different prediction modes.

Techniques are described in this disclosure that may enable a video encoder (which may also be referred to as a "video coder") to reduce the space required to store rate distortion values when selecting from multiple, different prediction modes. In general, encoded video data may include prediction data and residual data. For example, the video encoder may produce prediction data during an intra-prediction mode or an inter-prediction mode. Intra-prediction, for instance, generally involves predicting pixel values in a block of a picture relative to one or more reference blocks (which may also referred to as "reference samples") in neighboring, previously coded blocks of the same picture, where the selected previously coded block may be referred to as a reference block. Intra-prediction may also be referred to as spatial prediction because the selected reference block is from the same picture as the block to be predicted. Inter-prediction typically involves predicting the pixel values in the block of a picture relative to one or more reference samples in temporally removed pictures. For this reason, inter-prediction may be referred to as temporal prediction because the selected reference blocks are from pictures different (and therefore temporally removed) from the picture having the block to be predicted.

When performing intra-prediction, the video encoder may select from among multiple, different intra-prediction modes (e.g., as further illustrated in FIG. 4A), computing an approximate cost associated with each of the intra-prediction modes. This approximate cost may approximate a rate-distortion cost often used when performing what may be considered a resource intensive full rate distortion optimization process. Computing a rate-distortion cost typically requires that the video encoder compute a predicted block using each of the intra-prediction modes and determine a difference between each of the predicted blocks and the current block (which is commonly referred to as a "residual block" that specifies the residual pixel values referenced above). The video encoder next transforms each of the residual blocks from the spatial domain to the frequency domain and quantizes the coefficient values in each of the transformed residual blocks to generate a corresponding encoded video block of coefficients. Finally, the video encoder may decode the encoded video block and comparing each of the decoded video blocks to the current block to determine a distortion metric. Moreover, this rate-distortion analysis may involve computing, for each of the intra-prediction modes, the amount of bits used to signal each of the encoded video blocks, given a quantization level.

The video encoder may compute an approximate cost, rather than perform full rate-distortion analysis for each of the predicted blocks predicted using a corresponding one of the intra-prediction modes. As further described in the disclosure, there are a number of different ways to approximate the full rate-distortion cost. In some examples, a video encoder may avoid computing the approximate cost for each of the intra-prediction modes and instead identify one or more so-called "most probable" intra-prediction modes during intraprediction coding. To identify a most probable mode, a video encoder may identify an intra-prediction mode of previously encoded blocks (which are often neighboring blocks that are adjacent to the current block and have already been intra-predicted, such as the block to the top or above and to the left of the current block). The intra-modes of these so-called neighboring blocks may have a relatively high probability of being the same or similar to the current block due to a spatial proximity of the neighboring blocks to the current block. In this respect, the video encoder may reduce the number of approximate cost calculations to only these most probable modes or these most probable modes and other likely modes (such as the planar and DC modes) that are statistically more likely to be used in comparison to other modes when performing intra-prediction.

In some implementations, however, the video encoder may perform intra-prediction with respect to a number of blocks in parallel, which may not allow the video encoder to determine these most probable modes. For example, a video encoder may perform intra-prediction with respect to a largest coding unit (LCU), which may be partitioned into a number of different sized coding units. If each of these CUs is concurrently being either intra-predicted or inter-predicted, the video encoder may be unable to use them to determine most probable modes for the current block.

As a result of being unable to utilize most probable modes when performing intra-prediction, the video encoder may attempt to compute approximate costs for each intra-prediction mode with respect to each CU in the LCU. The video encoder may store these approximate costs. Once the video encoder has completed encoding of neighboring blocks, the video encoder may then identify most probable modes for the current block, using the approximate costs computed for the current block to identify which of the various modes should be more fully tested using a more complex rate distortion analysis. By using the most probable modes in this way, the video encoder may reduce the number of predicted blocks that are analyzed using the full rate distortion analysis. In other words, some of the modes may be eliminated from the rate distortion analysis, potentially reducing an amount of resources (which may refer to memory and/or processor utilization) required to perform the rate distortion analysis.

While the above process of computing approximate costs for each intra-prediction mode with respect to each CU in the LCUS may enable highly parallel video coders (in the sense that the video encoder performs intra-prediction or inter-prediction with respect to a number of blocks concurrently) to more efficiently perform intra-prediction by reducing the number of predicted blocks that are analyzed using the full rate distortion analysis, this process may result in expensive video encoders due to the memory required to store the approximate costs. Given that the video encoder typically requires that these approximate costs be stored locally or on-chip and that such on-chip memory may be both costly and consume significant space on the video encoder chip (which may be referred to as "board space"), the video encoder that implements the above process may be more expensive than less-parallel video encoders that may encode each block sequentially.

In accordance with the techniques described in this disclosure, a video coder, such as a parallel video encoder (meaning a video encoder that encodes neighboring blocks concurrently with encoding the current block) may only store approximate costs for a subset of the total intra-prediction modes, thereby reducing on-chip memory requirements and providing for cost savings in terms of production of the video encoder. In operation, the video encoder may determine a first pre-defined set of intra-prediction modes for the current block. The current block may, in some examples, generally refer to a video block that the video coder is currently in the process of encoding. The number of intra-prediction modes in the first predefined set may be less than a total number of intra-prediction modes capable of being used to encode the current block. Often, this first predefined set of intra-prediction modes (e.g., modes 0, 1 and 26) comprises one, two or three intra-prediction modes that have been statistically identified as occurring on a more frequent basis than the remaining ones of the intra-prediction modes.

The video encoder may also determine a second set of intra-prediction modes for the current block in addition to the first predefined set of intra-prediction modes. Again, this second set of intra-prediction modes may include less intra-prediction modes than the total number of intra-prediction modes capable of being used to encode the current block. The second set of modes may not be predefined. In other words, the first predefined set of intra-prediction modes may be set (but the specific list of modes may vary across LCUs, slices, picture, sequence, etc.), while the second set is derived or determined randomly, by sampling, or some other selection process.

In any event, the video encoder may then compute an approximate cost for each intra-prediction mode identified in the first predefined set of intra-prediction modes and each intra-prediction mode identified in the second set of intra-prediction modes. The video encoder may store the approximate cost for each intra-prediction mode identified in the first predefined set of intra-prediction modes and some of intra-prediction modes identified in the second set of intra-prediction modes to a memory (where again this memory may represent an on-chip memory, such as a layer one (L1) cache). Given that the total number (i.e., the sum) of intra-prediction modes specified in both the first predefined set and the chosen ones in the second set is less than the total number of intra-prediction modes (e.g., 35 modes) that could be used to encode the current block, the video encoder may reduce (sometimes significantly, if only a few modes, e.g., 5 or 6, are specified in total between the first and second sets of intra-prediction modes) the amount of on-chip memory required to store these approximate costs.

FIG. 1 is a block diagram illustrating an example video encoding and decoding system 10 that may be configured to utilize the techniques described in this disclosure for reducing the space required to store rate distortion values when selecting from multiple, different prediction modes. As shown in the example of FIG. 1, system 10 includes a source device 12 that generates encoded video for decoding by destination device 14. Source device 12 may transmit the encoded video to destination device 14 via communication channel 16 or may store the encoded video on a storage medium 34 or a file server 36, such that the encoded video may be accessed by the destination device 14 as desired. Source device 12 and destination device 14 may comprise any of a wide variety of devices, including desktop computers, notebook (i.e., laptop) computers, tablet computers, set-top boxes, telephone handsets (including cellular telephones or handsets and so-called smartphones), televisions, cameras, display devices, digital media players, video gaming consoles, or the like.

In many cases, such devices may be equipped for wireless communication. Hence, communication channel 16 may comprise a wireless channel. Alternatively, communication channel 16 may comprise a wired channel, a combination of wireless and wired channels or any other type of communication channel or combination of communication channels suitable for transmission of encoded video data, such as a radio frequency (RF) spectrum or one or more physical transmission lines. In some examples, communication channel 16 may form part of a packet-based network, such as a local area network (LAN), a wide-area network (WAN), or a global network such as the Internet. Communication channel 16, therefore, generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

As further shown in the example of FIG. 1, source device 12 includes a video source 18, video encoder 20, a modulator/demodulator 22 ("modem 22") and a transmitter 24. In source device 12, video source 18 may include a source such as a video capture device. The video capture device, by way of example, may include one or more of a video camera, a video archive containing previously captured video, a video feed interface to receive video from a video content provider, and/or a computer graphics system for generating computer graphics data as the source video. As one example, if video source 18 is a video camera, source device 12 and destination device 14 may form so-called camera phones or video phones. The techniques described in this disclosure, however, are not limited to wireless applications or settings, and may be applied to non-wireless devices including video encoding and/or decoding capabilities. Source device 12 and destination device 14 are, therefore, merely examples of coding devices that can support the techniques described herein.

Video encoder 20 may encode the captured, pre-captured, or computer-generated video. Once encoded, video encoder 20 may output this encoded video to modem 22. Modem 22 may then modulate the encoded video according to a communication standard, such as a wireless communication protocol, whereupon transmitter 24 may transmit the modulated encoded video data to destination device 14. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later retrieval, decoding and consumption. The storage medium 34 may include Blu-ray discs, DVDs, CD-ROMs, flash memory, or any other suitable digital storage media for storing encoded video. Destination device 14 may access the encoded video stored on the storage medium 34 or the file server 36, decode this encoded video to generate decoded video and playback this decoded video.

File server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. Destination device 14 may access file server 36 in accordance with any standard data connection, including an Internet connection. This connection may include a wireless channel (e.g., a Wi-Fi connection or wireless cellular data connection), a wired connection (e.g., DSL, cable modem, etc.), a combination of both wired and wireless channels or any other type of communication channel suitable for accessing encoded video data stored on a file server.

Destination device 14, in the example of FIG. 1, includes a receiver 26, a modem 28, a video decoder 30, and a display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding the associated encoded video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 of destination device 14 represents any type of display capable of presenting video data for consumption by a viewer. Although shown as integrated with destination device 14, display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG 4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, a prediction direction (whether bi-predicted or uni-predicted) and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As described above, video encoder 20 may perform intra-prediction. When performing intra-prediction, a conventional video encoder may select from among multiple, different intra-prediction modes (e.g., as further illustrated in FIG. 4A), often by performing a rate distortion analysis with respect to each of the modes. Computing a rate-distortion cost typically requires that the video encoder compute a predicted block using each of the intra-prediction modes and determine a difference between each of the predicted blocks and the current block (which is commonly referred to as a "residual block" that specifies the residual pixel values referenced above). The video encoder then transforms each of the residual blocks from the spatial domain to the frequency domain and quantizes the coefficient values in each of the transformed residual blocks to generate a corresponding encoded video block of coefficients. Finally, the video encoder may decode the encoded video block, comparing each of the decoded video blocks to the current block to determine a distortion metric. Moreover, this rate-distortion analysis may involve computing, for each of the intra-prediction modes, the amount of bits used to signal each of the encoded video blocks, given a quantization level.

In accordance with the techniques described in this disclosure, video encoder 20 may determine a first set of predefined prediction modes, and additionally, a second set of prediction modes based on one or more selection techniques. Collectively, the first and second sets comprise a subset of all possible prediction modes. The video coder may then store approximate cost values that correspond to one or more modes of the subset for later use when coding a given block. Based on the approximate cost values of the prediction modes in the subset, the video coder subsequently selects a prediction mode to code the given block. Further details of the techniques are illustrated in, for example, FIG. 2 below.

Video decoder 30 may receive a bitstream comprising coded data and decode the data in accordance with corresponding syntax elements received from video encoder 20. Video decoder 30 may generally perform reciprocal operations to those described above with respect to video encoder 20. That is, video decoder 30 may entropy decode each block of encoded video data, perform inverse quantization to de-quantize the block of encoded video data and apply an inverse transform to transform the de-quantized block of encoded video data form the frequency domain to the spatial domain. This transformed block of encoded video data may represent a reconstructed version of the residual data. In the prediction process, video decoder 30 may select a corresponding prediction mode to decode a given block based on syntax elements that signal prediction modes. That is, video encoder 20 may, in accordance with techniques of the disclosure, send one or more syntax elements that signal a prediction mode for a given block, which video decoder 30 may subsequently use to decode the given block.

Figure 2:
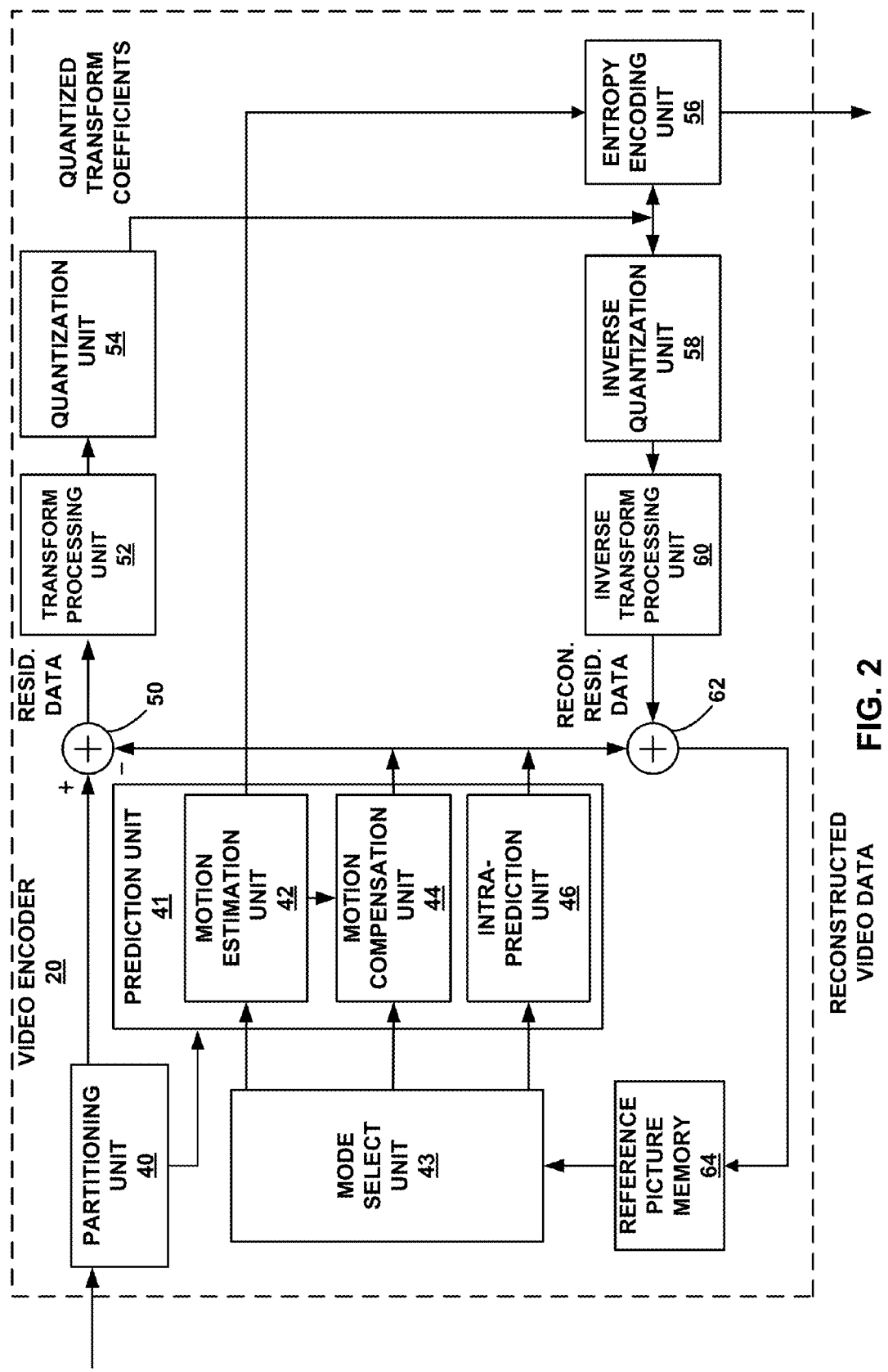
FIG. 2 is a block diagram illustrating an example of a video encoder that may implement techniques for reducing the space required to store rate distortion values when selecting from multiple, different prediction modes.

FIG. 2 is a block diagram illustrating an example of video encoder 20 that may implement techniques for potentially reducing space required to store rate distortion values when selecting from multiple, different prediction modes. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 40, prediction unit 41, reference picture memory 64, summer 50, transform processing unit 52, quantization unit 54, and entropy encoding unit 56. Prediction unit 41 includes motion estimation unit 42, motion compensation unit 44, and intra prediction unit 46. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter. Video encoder 20 also includes a mode select unit 43. Mode select unit 43 may select one of the coding modes, intra or inter, e.g., based on error results. As further described in FIG. 2, mode select unit 43 may implement techniques for reducing the space required to store rate distortion values when selecting from multiple, different prediction modes.

As shown in FIG. 2, video encoder 20 receives video data, and partitioning unit 40 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. In general, a slice may be divided into multiple video blocks (and possibly into sets of video blocks referred to as tiles).

Mode select unit 43 may select one of a plurality of possible coding modes, such as one of a plurality of intra coding modes or one of a plurality of inter coding modes, for the current video block based on error results (e.g., coding rate and the level of distortion). Prediction unit 41 may provide the resulting intra- or inter-coded block to summer 50 to generate residual block data and to summer 62 to reconstruct the encoded block for use as a reference picture. In some examples, mode select unit 43 may analyze each of the reconstructed video blocks to select a best rate-to-distortion ratio through a process commonly referred to as "rate-distortion optimization," which may be abbreviated as "RDO." Further details of FIG. 2 described below illustrate mode selection techniques in accordance with one or more aspects of the disclosure.

Aspects of this disclosure generally relate to intra-coding. As such, certain techniques of this disclosure may be performed by mode select unit 43. That is, for example, mode select unit 43 may perform the techniques of this disclosure described with respect to FIGS. 2-8 below. In other examples, one or more other units of video encoder 20, e.g., intra-prediction unit 46, may additionally, collectively, or alternatively be responsible for performing the techniques of this disclosure.

Motion estimation unit 42 and motion compensation unit 44 within prediction unit 41 perform inter-predictive coding of the current video block relative to one or more predictive blocks in one or more reference pictures to provide temporal compression. Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction unit 46 within prediction unit 41 may perform intra-predictive coding of the current video block relative to one or more neighboring blocks in the same picture or slice as the current block to be coded to provide spatial compression. Accordingly, intra-prediction unit 46 may intra-predict a current block, as an alternative to the inter-prediction performed by motion estimation unit 42 and motion compensation unit 44, as described above.

In particular, mode select unit 43 may determine an intra-prediction mode to use to encode a current block based on amounts of rate distortion corresponding to a given mode and block. In some examples, intra-prediction unit 46 may encode a current block using various intra-prediction modes received from mode select unit 43, e.g., during separate encoding passes.

Mode select unit 43 may calculate rate-distortion values using a rate-distortion analysis for the various tested intra-prediction modes, and select the intra-prediction mode having the best rate-distortion characteristics among the tested modes. Rate-distortion analysis generally involves determining an amount of distortion (or error) between an encoded block and an original, unencoded block that was encoded to produce the encoded block, as well as a bit rate (that is, a number of bits) used to produce the encoded block. Mode select unit 43 may calculate ratios from the distortions and rates for the various encoded blocks to determine which intra-prediction mode exhibits the best rate-distortion value for the block. According to the proposed HEVC standard, there may be up to 35 intra-prediction modes, and each intra-prediction mode may be associated with an index.

When performing intra-prediction, mode select unit 43 may analyze an approximate cost associated with each possible intra-prediction modes rather than performing full rate distortion analysis. This approximate cost may approximate a rate-distortion cost. Computing a rate-distortion cost typically requires that the video encoder compute a predicted block using each of the intra-prediction modes, determine a difference between each of the predicted blocks and the current block (which is commonly referred to as a "residual block" that specifies the residual pixel values referenced above), transform each of the residual blocks from the spatial domain to the frequency domain, quantize the coefficient values in each of the transformed residual blocks to generate a corresponding encoded video block of coefficients, and then decode the encoded video block, comparing each of the decoded video blocks to the current block to determine a distortion metric. Moreover, this rate-distortion analysis may involve computing, for each of the intra-prediction modes, the amount of bits used to signal each of the encoded video blocks, given a quantization level.

As described above, rather than performing full rate-distortion analysis for each of the predicted blocks predicted using a corresponding one of the 35 intra-prediction modes, mode select unit 43 may compute an approximate cost for one or more intra-prediction modes. Mode select unit 43 may implement one or more example techniques to approximate the full rate-distortion cost. Some example techniques may be generally referred to as Lagrangian rate distortion approximations. In order to determine a best mode out of a large number of possible modes, a Lagrange multiplier may be applied to measure the cost for each different mode. A Lagrange multiplier may be based on a distortion measure, D, and a rate measure, R. The distortion measure could be defined differently for different implementation, for example sum of square error (SSE), sum of absolute difference (SAD), or sum of absolute transform difference (SATD). The rate measure represents how many bits are needed to encode the current mode information. For example, the rate measure may include the bits that are used to signal prediction mode type, intra mode index, or motion vector, etc. Once the values of D and R are obtained, the cost, C, may be calculated as shown in equation (1), where $\lambda$ is a pre-defined constant:

$$C = D + \lambda * R \quad (1)$$

Mode select unit 43 may select the best mode by choosing the mode which yields the minimum C.

As one example, mode select unit 43 may implement techniques to compute a sum of squared distortion (SSD), a sum of absolute difference (SAD) and a sum of absolute transform differences (SATD). Mode select unit 43 may implement SATD as a way by which to approximate the rate-distortion cost, and mode select unit 43 may compute the SATD in accordance with the following equation (2):

$$J(SATD) = \Sigma_{i,j} |T_{N \times N}(X(i,j) - \widehat{X(i,j)}))| + \lambda \cdot R_{mode} \quad (2)$$

In equation (1), $\hat{X}$ represents the predicted block for current block X, $T_{N \times N}(\cdot)$ is a N×N transform (such as the Hadamard Transform), $\lambda$ is the Lagrange multiplier (which may be selected empirically), and $R_{mode}$ is the number bits used to encode the mode.

Mode select unit 43 may avoid computing the approximate cost for each of the possible intra-prediction modes and instead identify one or more so called "most probable" intra-prediction modes during intra-prediction coding. To identify a most probable mode, mode select unit 43 may identify an intra-prediction mode of previously encoded blocks (which are often neighboring blocks that are adjacent to the current block). The intra-modes of these so-called neighboring blocks may have a relatively high probability of being the same or similar to the current block due to a spatial proximity of the neighboring blocks to the current block. In this respect, mode select unit 43 may reduce the number of approximate cost calculations to only these most probable modes or these most probable modes and other likely modes (such as the planar and DC modes) that are statistically more likely to be used when performing intra-prediction than other modes.

In some implementations, a video encoder may perform intra-prediction with respect to a number of blocks in parallel, which may not allow the video encoder to determine these most probable modes. For example, the video encoder may perform intra-prediction with respect to a largest coding unit (LCU), which may be partitioned into a number of different sized coding units. If each of these CUs is concurrently being either intra-predicted or inter-predicted, the video encoder may be unable to use them to determine most probable modes for the current block. As a result of being unable to utilize most probable modes when performing intra-prediction, the video encoder may attempt to compute approximate costs, using the SATD cost noted above, for each intra-prediction mode with respect to each CU in the LCU. While the above process may enable highly parallel video encoders to more efficiently perform intra-prediction by reducing the number of predicted blocks that are analyzed using the full rate distortion analysis, this process may result in expensive video encoders due to the memory required to store the approximate costs.

In order to reduce the storage required, this disclosure proposes techniques to determine an intra-prediction mode for a current block based on approximate cost values of a subset of all possible intra-prediction modes. For instance, a video encoder may form a subset of intra prediction modes among all possible intra prediction modes. For those intra prediction modes inside the subset, the video encoder may store distortion measures, such as approximate cost values as described in the disclosure. For instance, the video encoder may selectively store one or more best modes, e.g., modes with approximate cost values below a threshold, from using Lagrange multipliers.

Referring to FIG. 2, mode select unit 43, in accordance with techniques of the disclosure, may only store approximate costs for a subset of the total intra-prediction modes, thereby reducing on-chip memory requirements and thereby providing for cost savings in terms of production of the video encoder. For example, mode select unit 43 may initially determine a current block to encode from partitioning unit 40. Mode select unit 43 may determine a first set of intra-prediction modes for the current block of the video data to be encoded by intra-prediction unit 46. The first set of intra-prediction modes may include less intra-prediction modes than a total number of intra-prediction modes capable of being used by intra-prediction unit 46 to encode the current block. In some examples, this first predefined set of intra-prediction modes (e.g., modes 0, 1 and 26) comprises one or more intra-prediction modes that have been statistically identified as occurring on a more frequent basis than the remaining ones of the intra-prediction modes. That is, in some examples, intra-prediction unit 46 may determine one or more statistics that indicate the number of occurrences that one or more modes are selected by mode select unit 43, and based at least in part on the statistics, mode select unit 43 may select the modes included in the first set of intra-prediction modes.

Mode select unit 43, in some examples, may determine the first set of intra-prediction modes for a discrete quantity of video data, such as LCUs, CUs, slices, picture, sequence, etc. In some examples, mode select unit 43 may determine different first sets of pre-defined intra-prediction modes that vary across discrete quantities of video data, such as LCUs, CUs, slices, picture, sequence, etc. For instance, mode select unit 43 may select different first sets of pre-defined intra-prediction modes for different, respective LCUs. As another example, mode select unit 43 may select different first sets of pre-defined intra-prediction modes for different, respective slices, pictures, sequences, etc.

Mode select unit 43 may also determine a second set of intra-prediction modes for the current block in addition to the first predefined set of intra-prediction modes. The second set of modes may not be predefined. Instead, mode select unit 43 may determine the second set according to one or more selection techniques. For instance, mode select unit 43 may implement a random selection technique in which mode select unit 43 randomly selects one or more modes. In some examples, the number of modes randomly selected by mode select unit 43 may be less than a threshold value. In other examples, the number of modes randomly selected by mode select unit 43 may be greater than a threshold value.

In other examples of selection techniques, mode select unit 43 may implement sampling techniques to select one or more modes. For instance, mode select unit 43 may sample one or more sample blocks that are neighboring blocks to the current block. Based on modes associated with the sample blocks that are neighboring blocks to the current block, mode select unit 43 may select one or more modes for the current block. Neighboring blocks may be blocks that are adjacent to the current block in the picture that includes the current block. In some examples, a neighboring block may be may be a previous adjacent block on the same horizontal, vertical and/or diagonal dimension as the current block. In other examples, a neighboring block may be the previous block in a raster order to the current block. In any case, upon determining modes for one or more sample blocks, mode select unit 43 may determine one or more modes of the sample blocks that are selected by mode select unit 43 with a number of occurrences that is greater than a threshold value. In some examples, the number of modes selected by mode select unit 43 based on the sample blocks may be less than a threshold value. In some examples, the quantity of modes selected by mode select unit 43 based on the statistics may be greater than a threshold value. In other examples, the quantity of modes selected by mode select unit 43 based on the statistics may be less than a threshold value.

In other examples of selection techniques, mode select unit 43 may implement sampling techniques to select one or more modes based on previously encoded intra-predicted pictures. For instance, mode select unit 43 may generate statistics for modes selected by mode select unit 43 in previously encoded intra-predicted pictures, i.e., intra-predicted pictures having display and decoding orders less than the picture that includes the current block. For example, mode select unit 43 may include one or more counters corresponding to one or more intra-prediction modes. Mode select unit 43 may increment a counter of a respective mode when selected for intra-predicting a block of picture. In some examples, based on the statistics, mode select unit 43 may select one or more modes to include in the second set of prediction modes. For instance, mode select unit 43 may select one or more modes that have the corresponding counters with values greater than a threshold value. In some examples, the number of modes selected by mode select unit 43 based on the statistics may be less than a threshold value. In some examples, the quantity of modes selected by mode select unit 43 based on the statistics may be greater than a threshold value. In other examples, the quantity of modes selected by mode select unit 43 based on the statistics may be less than a threshold value.

The number of modes in each of the first set of pre-defined prediction modes and the second set of determined prediction modes may be the same in some examples. In other examples, the number of modes the first set of pre-defined prediction modes may be different from the number of modes in the second set of determined prediction modes. For instance, the number of modes the first set of pre-defined prediction modes may be less than the number of modes in the second set of determined prediction modes. In other examples, the number of modes the first set of pre-defined prediction modes may be greater than the number of modes in the second set of determined prediction modes. In some examples, the second set of intra-prediction modes may include fewer intra-prediction modes than the total number of intra-prediction modes capable of being used to encode the current block. The first set of intra-prediction modes may include fewer intra-prediction modes than the total number of intra-prediction modes capable of being used to encode the current block.

As described above, mode select unit 43 may therefore determine a first set of intra-prediction modes that are pre-defined, and a second set of intra-prediction modes that are based on one or more selection techniques. Collectively, the first and second sets of intra-prediction modes may comprise a subset of all the possible intra-prediction modes. In some examples, mode select unit 43 may compute an approximate cost for each intra-prediction mode included in the first set of intra-prediction modes and each intra-prediction mode included in the second set of intra-prediction modes. In other examples, mode select unit 43 may compute an approximate cost for each possible intra-prediction mode and store a subset of the intra-prediction modes in the second set of intra-prediction modes. Mode select unit 43 may compute an approximate cost using one or more example distortion measure techniques described above such as, sum of squared distortion (SSD), a sum of absolute difference (SAD) and a sum of absolute transform differences (SATD). An approximate cost approximates a rate distortion cost of encoding a current block of video data using the corresponding one of the intra-prediction modes included in the first and/or second sets of intra-prediction modes.

Upon determining the approximate costs for each intra-prediction mode, mode select unit 43 may store the approximate cost for each intra-prediction mode identified in the first set of intra-prediction modes and some or all of the intra-prediction modes identified in the second set of intra-prediction modes to a memory. In other examples, mode select unit 43 may store a subset of the approximate costs for one or more of the intra-prediction modes identified in the first set of intra-prediction modes and/or for one or more of the intra-prediction modes identified in the second set of intra-prediction modes. The memory to which mode select unit 43 may store the approximate costs may be on-chip memory. That is, the on-chip memory (e.g., registers, on-chip caches, etc.) may be included in or integrated with a microprocessor that implements some portions or all of video encoder 20. In other examples, the memory to which mode select unit 43 may store the approximate costs may be off-chip memory. Off-chip memory may include, e.g., dynamic random access memory (DRAM), that a microprocessor accesses via an external memory interface. In any case, by only storing approximate costs for a subset of the total intra-prediction modes a parallel video encoder, mode select unit 43 may reduce on-chip memory requirements and thereby providing for cost savings in terms of production of the video encoder.

Mode select unit 43 may select a mode from the first set and/or the second set of intra-prediction modes for which mode select unit 43 has generated approximate costs. For example, mode select unit 43 may select the mode associated with the lowest approximate cost. In other examples, mode select unit 43 may determine a most-recently used set of one or more modes that are included in first and second sets. Mode select unit 43 may select the mode associated with the lowest approximate cost in the recently used set of one or more modes. Modes included in the recently used set may be modes selected in a prior number of most recently selections by mode select unit 43. The most recently-used set of one or more modes may be a subset of the all the modes included collectively within the first and second sets. Upon selecting a mode to code the current block, based on the approximate costs of one or more modes, mode select unit 43 may send data to intra-prediction unit 46 to encode the current block with the selected mode. In some examples, techniques of the present disclosure may be performed in parallel by video encoder 20. That is, video encoder 20 may perform either intra-prediction or inter-prediction with respect to one or more neighboring blocks of the video data that are adjacent to the current block concurrently with performing intra-prediction to encode the current block.

Intra-prediction unit 46 may perform intra-prediction to encode the current block in accordance with one of the intra-prediction modes identified by the first set of intra-prediction modes or the second set of intra-prediction modes, i.e., the mode selected by mode select unit 43 for the current block. In this way, intra-prediction 46 may encode the current block based on the approximate cost computed for each intra-prediction mode identified in the first set of intra-prediction modes and the second set of intra-prediction modes. Using the selected mode indicated by mode select unit 43, intra-prediction unit 46 may determine a predictive block to encode the current block. For instance, the prediction mode may indicate which block or group of blocks intra-prediction mode will evaluate to select the predictive block.

After intra-prediction unit 46 determines the predictive block for the current video block, summer 50 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Entropy encoding unit 56 may also entropy encode the motion vectors and the other syntax elements for the current video slice being coded. Following the entropy encoding by entropy encoding unit 56, the encoded bitstream may be transmitted to video decoder 30, or archived for later transmission or retrieval by video decoder 30.

Entropy coding unit 56 may encode the information indicating the selected intra-prediction mode in accordance with the techniques of this disclosure. Video encoder 20 may include in the transmitted bitstream configuration data, one or more intra-prediction mode index tables and a plurality of modified intra-prediction mode index tables (also referred to as codeword mapping tables), definitions of encoding contexts for various blocks, encoded video data, etc. These types of information that video encoder 20 may include in the transmitted bitstream are exemplary, and many other types of information may also be included in the bitstream.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Figure 3:
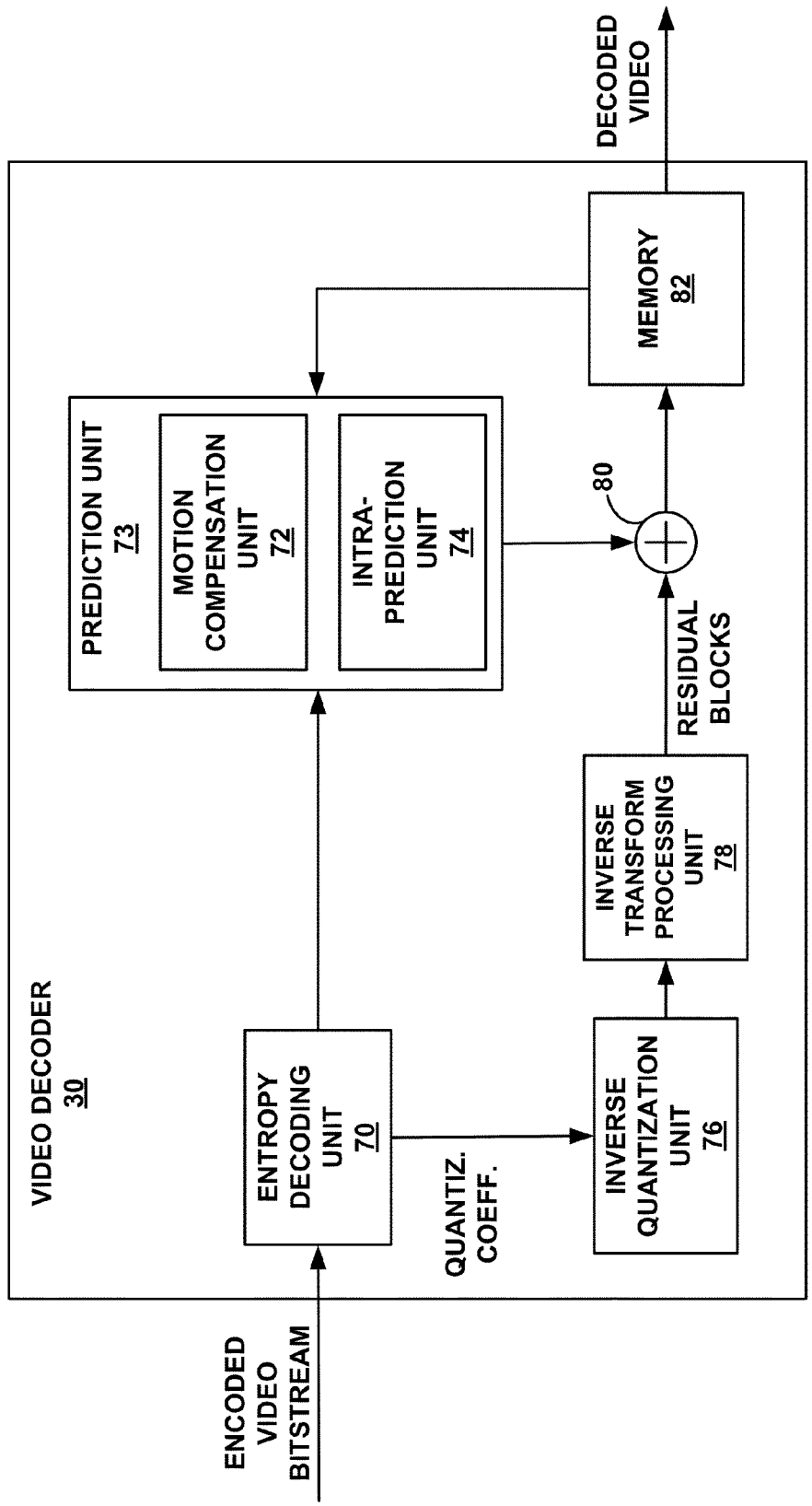
FIG. 3 is a block diagram illustrating an example of a video decoder that may implement the techniques described in this disclosure.

FIG. 3 is a block diagram illustrating an example video decoder 30 that may implement the techniques described in this disclosure. In the example of FIG. 3, video decoder 30 includes an entropy decoding unit 70, prediction unit 73, inverse quantization unit 76, inverse transform processing unit 78, summer 80, and reference picture memory 82. Prediction unit 73 includes motion compensation unit 72 and intra-prediction unit 74. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. The encoded bitstream may include, among other information, prediction modes that correspond to blocks and which were selected by mode select unit 43 as previously described with respect to FIG. 2, in accordance with techniques of the disclosure. Entropy decoding unit 70 of video decoder 30 may entropy decode the bitstream to generate quantized coefficients, motion vectors, and other syntax elements. Entropy decoding unit 70 may forward the motion vectors and other syntax elements to prediction unit 73. Video decoder 30 may receive the syntax elements at the video slice level and/or the video block level.

When the video slice is coded as an intra-coded (I) slice, intra prediction unit 74 of prediction unit 73 may generate prediction data for a video block of the current video slice based on a signaled intra prediction mode and data from previously decoded blocks of the current frame or picture. Intra-prediction unit 74 may determine the appropriate intra-prediction mode for decoding the current block of video data based on an index corresponds to the intra-prediction mode for the current block. The intra-prediction mode may have been previously selected by mode select unit 43 as previously described with respect to FIG. 2, and the index may have been included in the encoded bitstream sent by video encoder 20 to video decoder 30. Intra-prediction unit 74 may select a predictive block based on the intra-prediction mode corresponding to the index. Summer 80 may add the predictive block data and residual block data from inverse transform processing unit 78 to generate the decoded current block. Memory 82 may store the decoded current block, which may be subsequently outputted by a display device or sent to another computing device.

As noted above, aspects of this disclosure generally relate to intra-coding. As such, certain techniques of this disclosure may be performed by intra-prediction unit 74. That is, for example, intra-prediction unit 74 may perform the techniques of this disclosure described with respect to FIGS. 4A-8 below. In other examples, one or more other units of video decoder 30 may additionally or alternatively be responsible for performing the techniques of this disclosure.

When the video picture is coded as an inter-coded (e.g., B, P or GPB) slice, motion compensation unit 72 of prediction unit 73 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 70. The inverse quantization process may include use of a quantization parameter calculated by video encoder 20 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Figure 4B:
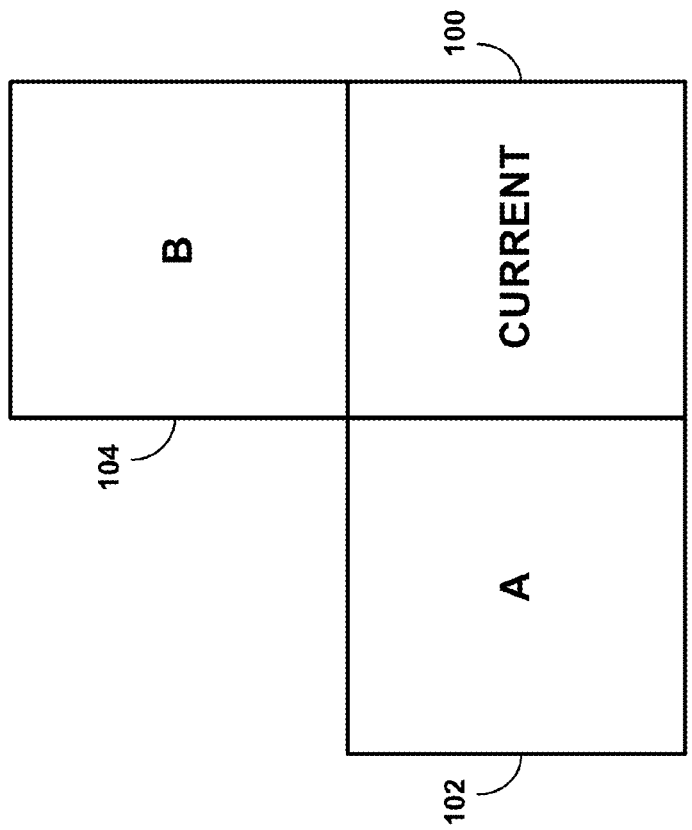
FIG. 4B is a block diagram illustrating a conceptual representation a current block to be intra-predictively coded and neighboring blocks, in accordance with techniques described in this disclosure.
Figure 4A:
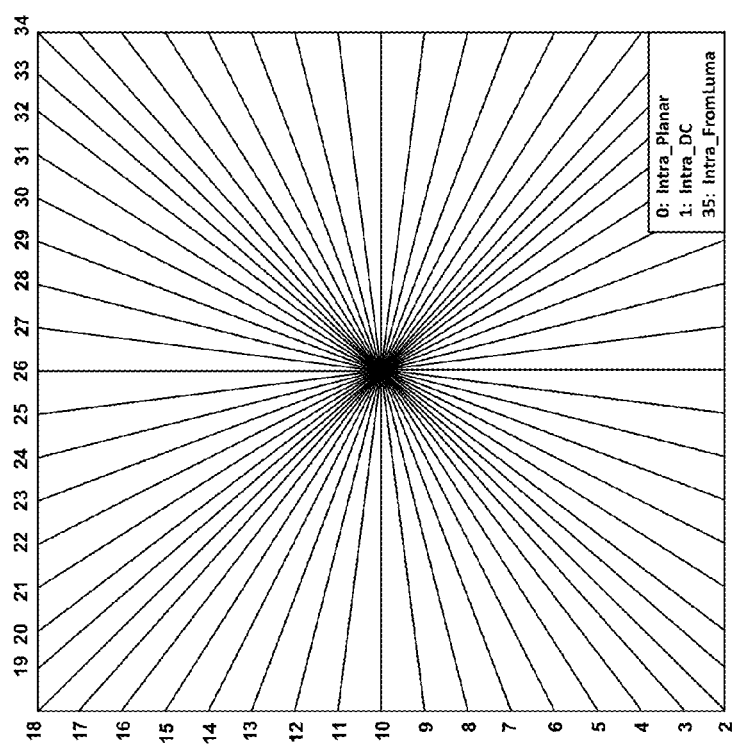
FIG. 4A is a block diagram illustrating a conceptual representation of intra-prediction modes that a video coder may select, in accordance with techniques described in this disclosure.

FIG. 4A is a block diagram illustrating a conceptual representation of intra-prediction modes that a video coder may select, in accordance with techniques described in this disclosure. Video coding standards such as H.264/AVC, MPEG-2, and HEVC use block-based hybrid video coding frameworks. In such frameworks, a picture is divided into blocks of different sizes, which in HEVC is called a CU (coding unit). As previously described, each CU may be split into smaller blocks for prediction (PU) or transform (TU). Each PU may be predicted either within the current slice in the case of intra mode or from the temporally neighboring slices in the case of inter mode. The prediction error is transformed, quantized and coded using variable length coding techniques, as described in FIGS. 1-3.

In video data there may exist a relatively high correlation between samples in a rectangle area and the samples that are immediately adjacent to that area. In some examples, video coding techniques such as HEVC use intra prediction to predict the current PU from samples in adjacent, previously coded PUs. In HEVC, intra prediction provides 35 modes for different PUs. The 35 modes include planar mode (mode 0), DC mode (mode 1) and 33 angular prediction modes which correspond to 33 prediction direction of angles+/−[0,2,5,9, 13,17,21,26,32]/32.

FIG. 4A illustrates the 35 angular prediction directions for all the modes defined in HEVC. In planar mode (denoted as "mode 0" or "0"), video encoder 20 may predict pixel values for the current block from the pixel values in the column adjacent to the left column of the current block. In DC mode (denoted as "mode 1" or "1"), video encoder 20 may compute a predictive block from the mean of the sum of the values of the pixels in the row above the top row of the current block and the values of the pixels in the column adjacent to the left most column of the current block. In the angular prediction mode, video encoder 20 may predict pixels along a given angle (which is shown above as intra-prediction modes 2-34) typically from the pixel values from either the row above the top row of the current block or the pixel values of the column adjacent to the left-most column of the current block.

In some implementations, a video encoder may require that rate distortion values associated with different intra prediction modes for a current block be available even before a prediction mode is determined for some of the dependent neighboring blocks. This requirement may be needed due to design tradeoffs between implementation complexity (or cost) and coding performance such as coding efficiency, throughput, etc. For example, a video encoder may have to handle a number of blocks in parallel, e.g. all the possible blocks in an LCU, in checking intra mode cost and inter mode cost, respectively. In this case, for a current block among those blocks, a video encoder may need to compute distortion values of coding the current block using different intra prediction modes before the prediction modes, e.g. intra or inter, of its dependent neighboring blocks can be determined.

In such implementations, the signaling cost of the intra prediction mode, in terms of number of bits, for the current block may not be obtainable because it is dependent on neighboring blocks' prediction modes that are not determined at that moment. As a result, a rate of distortion may not available either for the current block. A video encoder may store all the distortion values for each intra prediction mode for each block in a LCU. At a later stage when the video encoder determines the prediction modes of the dependent neighboring blocks, the video encoder may determine a rate of distortion value for the current block associated with each intra prediction mode on the fly and a cost can be calculated with the related distortion value retrieved. While such a scheme enables cost evaluation using Lagrange multipliers for all possible intra prediction modes for each block, the amount of the storage required to hold all the distortion values for all possible blocks in one LCU may be large. For example, assuming that the LCU size is 32×32 and also assuming that each distortion value takes 32 bits to store and each mode index 6 bits, the needed storage for each intra prediction mode for all possible blocks in the LCU is shown in Table 1:

TABLE 1

| PU size | # of PU in LCU | Storage (bits) (distortion 32 bits, mode index 6 bits) |
|---|---|---|
| 4 × 4 | 64 | 2432 |
| 8 × 8 | 16 | 608 |
| 16 × 16 | 4 | 152 |
| 32 × 32 | 1 | 38 |
| Total | 85 | 3230 |

Among the 3230 bits shown in Table 1, 2720 bits are used to store distortion measure values and 510 bits mode index values. If all 35 modes as illustrated in FIG. 4B are stored for each PU (or block) inside the LCU, a total number of 2720*35=95200 bits is needed for storing the distortion measure values. Such a size of storage could be costly in practice. As further described in FIG. 4B, a video encoder may avoid computing the approximate cost for each of the 35 intra-prediction modes and instead identify one or more "most probable" intra-prediction modes during intra-prediction coding. In some implementations, however, the video encoder may perform intra-prediction with respect to a number of blocks in parallel, which may not allow the video encoder to determine these most probable modes.

In accordance with techniques of the disclosure, rather than determining approximate cost values for each possible prediction mode, video encoder 20 may determine approximate cost values for a subset of the all the possible prediction modes. That is, video encoder 20 may select the mode based on a corresponding approximate cost value that represents an approximate rate of distortion for the selected mode. Rather than determining approximate cost values for each possible prediction mode, video encoder 20 may determine approximate cost values for a subset of the all the possible prediction modes. For instance, video encoder 20 may determine a first set of pre-defined prediction modes, and additionally, a second set of prediction modes based on one or more selection techniques as described in FIG. 2. Collectively, the first and second sets comprise a subset of all possible prediction modes. Video encoder 20 may then store approximate cost values that correspond to one or more modes of the subset for later use when coding a given block. Based on the approximate cost values of the prediction modes in the subset, video encoder 20 subsequently selects a prediction mode to code the given block. Since the total number prediction modes specified in both the first set and the second set is less than the total number of all possible prediction modes, the amount of on-chip memory required by video encoder 23 to store these approximate cost values may less than computing approximate cost values for all possible prediction modes.

FIG. 4B is a block diagram illustrating a conceptual representation a current block to be intra-predictively coded and neighboring blocks, in accordance with techniques described in this disclosure. FIG. 4B illustrates an example of a current block 100, which may be referred to as a current coding unit ("current CU") and two neighboring blocks, block 102 ("block A") and block 104 ("block B"), that may be considered during intra-coding. For example, a video encoder may consider the intra-prediction modes used to code neighboring block 102 (positioned to the left of the current block) and neighboring block 104 (positioned above the current block) as the most probable intra-modes of the current block.

As previously described in FIGS. 2 and 4A, a video encoder may compute an approximate cost that may approximate a rate-distortion cost, rather than computing full rate-distortion costs. Instead of computing the approximate cost for each of the possible intra-prediction modes, a video encoder may identify one or more so called "most probable" intra-prediction modes during intra-prediction coding. To identify a most probable mode, a video encoder may identify an intra-prediction mode of previously encoded blocks (which are often neighboring blocks that are adjacent to the current block). The intra-modes of these so-called neighboring blocks may have a relatively high probability of being the same or similar to the current block due to a spatial proximity of the neighboring blocks to the current block. A video encoder may reduce the number of approximate cost calculations to only these most probable modes or these most probable modes and other likely modes (such as the planar and DC modes) that are statistically more likely to be used when performing intra-prediction than other modes.

In some implementations, however, the video encoder may perform intra-prediction with respect to a number of blocks in parallel, which may not allow the video encoder to determine these most probable modes. For example, a video encoder may perform intra-prediction with respect to a largest coding unit (LCU), which may be partitioned into a number of different sized coding units. If each of these CUs is concurrently being either intra-predicted or inter-predicted, the video encoder may be unable to use them to determine most probable modes for the current block. To illustrate, the video encoder may be intra-predicting both of neighboring blocks 102 and 104 shown in FIG. 4B, while also performing intra-prediction with respect to current block 100. Given that the video encoder has not completed intra-prediction of block 102 and 104, the video encoder does not yet know the intra-prediction mode used to encode blocks 102 and 104 and therefore may be able to determine most probable modes when attempting to perform intra-prediction with respect to current block 100.

As a result of being unable to utilize most probable modes when performing intra-prediction, the video encoder may attempt to compute approximate costs for each intra-prediction mode with respect to each CU in the LCU. The video encoder may store these approximate costs as, for example, 32-bit values, using six bits to indicate to which mode the 32-bit approximate costs correspond. Once the video encoder has completed encoding of neighboring blocks 102 and 104, the video encoder may then identify most probable modes for current block 100, using the approximate costs computed for the current block to identify which of the various modes should be more fully tested using the more complex rate distortion analysis.

While the above process may enable highly parallel video encoders (in the sense that the video encoder performs intra-prediction or inter-prediction with respect to a number of blocks concurrently) to more efficiently perform intra-prediction by reducing the number of predicted blocks that are analyzed using the full rate distortion analysis, this process may result in expensive video encoders due to the memory required to store the approximate costs.

In accordance with the techniques described in this disclosure, a parallel video encoder, such as video encoder 20 in some examples, (meaning a video encoder that encodes neighboring block 102 and 104 concurrently with encoding current block 100) may only store approximate costs for a subset of the total 35 intra-prediction modes illustrated in FIG. 4A, which may thereby reduce on-chip memory requirements and provide for cost savings in terms of production of video encoder 20. In operation, video encoder 20 may determine a first pre-defined set of intra-prediction modes for current block 100. This number of intra-prediction modes in the first predefined set is less than a total number of intra-prediction modes (e.g., the 35 intra-prediction modes as shown in FIG. 4A) capable of being used by video encoder 20 to encode the current block. Often, this first predefined set of intra-prediction modes comprises one, two or three intra-prediction modes that have been statistically identified as occurring on a more frequent basis than the remaining ones of the intra-prediction modes (e.g., modes 0, 1 and 26).

Video encoder 20 may also determine a second set of intra-prediction modes for current block 100 in addition to the first predefined set of intra-prediction modes. Again, this second set of intra-prediction modes includes a quantity of intra-prediction modes less than or equal to the total number of intra-prediction modes capable of being used video encoder 20 to encode current block 100. The second set of modes may not be predefined. In other words, the first pre-defined set of intra-prediction modes may be set (but the specific list of modes may vary across LCUs, slices, picture, sequence, etc.), while the second set is derived or determined randomly, by sampling, or other processes, as previously described in FIG. 2.

Video encoder 20 may then compute an approximate cost for each intra-prediction mode identified in the first pre-defined set of intra-prediction modes and each intra-prediction mode identified in the second set of intra-prediction modes. Video encoder 20 may then store the approximate cost for each intra-prediction mode identified in the first pre-defined set of intra-prediction modes and some intra-prediction modes identified in the second set of intra-prediction modes to a memory. Given that the total number (i.e., the sum) of intra-prediction modes specified in both the first predefined set and the chosen ones in second set is less than the total number of intra-prediction modes that could be used to encode current block 100, video encoder 20 may reduce the amount of on-chip memory required to store these approximate costs.

Figure 5:
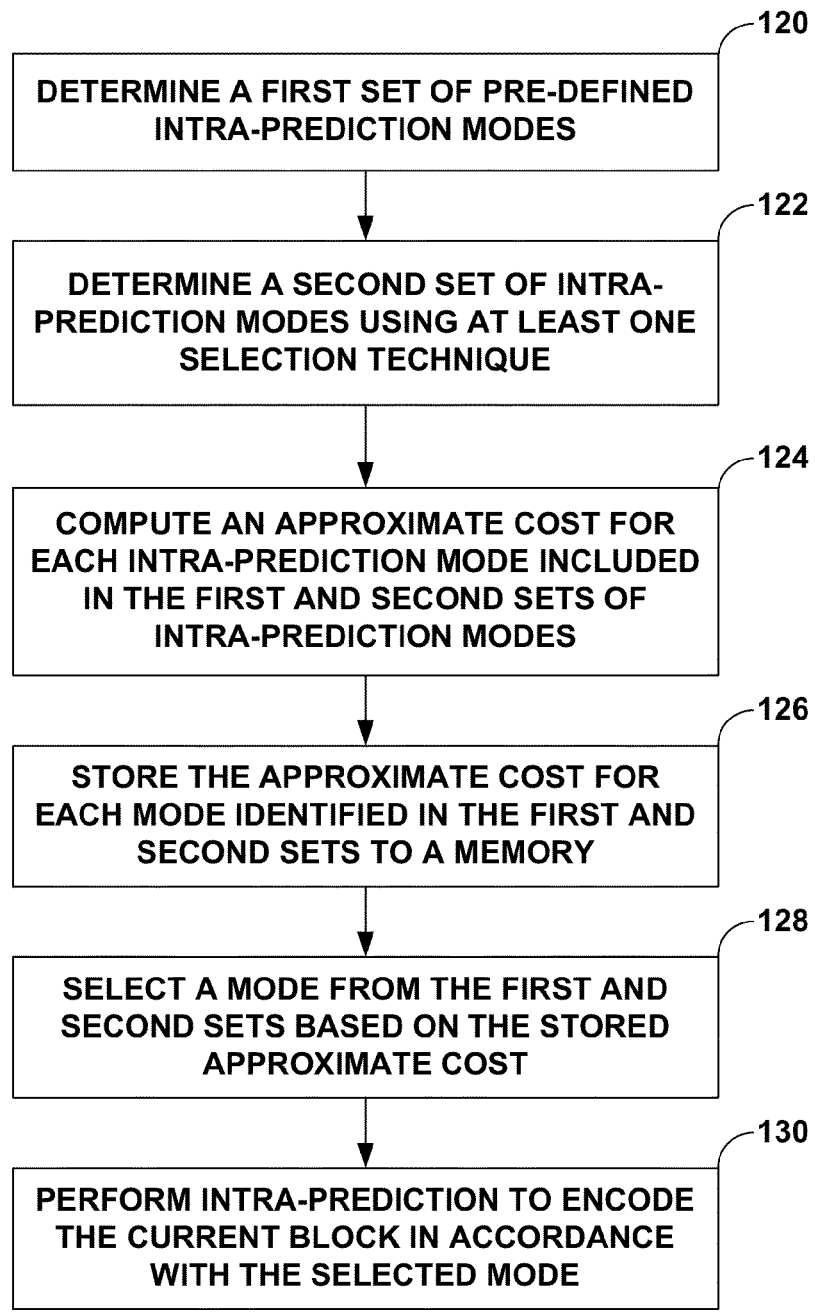
FIG. 5 is a flowchart illustrating exemplary operation of a video coder, such as the video encoder shown in FIG. 2, in performing aspects of reducing the space required to store rate distortion values when selecting from multiple, different prediction modes, in accordance with techniques of the disclosure.

FIG. 5 is a flowchart illustrating exemplary operation of a video coder, such as video encoder 20 shown in FIG. 2, in performing aspects of reducing the space required to store rate distortion values when selecting from multiple, different prediction modes, in accordance with techniques of the disclosure. In some examples, video encoder 20 may store, for each PU, distortion measures associated with M pre-defined intra prediction modes. In some examples, video encoder 20 may further select N modes out of all of the possible remaining modes with distortion measures determined and/or stored by video encoder 20. In this way, video encoder 20 may store a total of M+N modes as a subset of all possible modes. As one example, video encoder 20 may set M to mode 1, which is fixed as planar mode. Video encoder 20 may set N to either mode 2 or mode 3. Video encoder 20 may then select, a "best" mode from the subset using Lagrange multipliers based on available rate information. For instance, video encoder 20 may select the "best" mode from the subset as the mode with the lowest approximate cost. Reference is now made to the flowchart of FIG. 5 to further illustrate these example techniques.

Initially, referring first to video encoder 20, prediction unit 41 may receive a one or more video blocks of video data for encoding. In response to determining a current block to be coded, mode select unit 43 may determine a first set of intra-prediction modes for the current block of the video data to be encoded, as described above (120). In some examples, the first set of intra-prediction modes includes a pre-defined group of intra-prediction modes. The pre-defined group of intra-prediction modes (e.g., modes 0, 1 and 26) may include intra-prediction modes that have been statistically identified as occurring on a more frequent basis than the remaining ones of the intra-prediction modes. In some examples, the first set of intra-prediction modes includes less intra-prediction modes than a total number of intra-prediction modes capable of being used to encode the current block.

Mode select unit 43 may next determine a second set of intra-prediction modes for the current block in addition to the first predefined set of intra-prediction modes (122). As described in FIG. 2, mode select unit 43 may implement one or more selection techniques, such as random selection, sampling selection, etc., to select one or more intra-prediction modes. The second set of intra-prediction modes may include fewer intra-prediction modes than the total number of intra-prediction modes capable of being used to encode the current block. Moreover, both the first set and the second set may collectively include less intra-prediction modes in total than the total number of intra-prediction modes capable of being used to encode the current block.

In some examples, mode select unit 43 then computes an approximate cost for each intra-prediction mode included in the first set of intra-prediction modes and each intra-prediction mode included in the second set of intra-prediction modes (124). As described in FIG. 2, an approximate cost may approximate a rate distortion cost of encoding the current block of video data using the corresponding one of the intra-prediction modes. Mode select unit 43 may implement one or more example cost approximation techniques, using one or more example distortion measures such as, sum of squared distortion (SSD), a sum of absolute difference (SAD) and a sum of absolute transform differences (SATD).

Mode select unit 43 may then store the approximate cost for each intra-prediction mode identified in the first set of intra-prediction modes and for some or all intra-prediction modes identified in the second set of intra-prediction modes to a memory (126). The memory may be in on-chip memory (e.g., registers, on-chip caches, etc.) that is included in or integrated with a microprocessor that implements video encoder 20. The approximate costs for the intra-prediction modes included in the first and second sets may therefore be retrievable by video encoder 20 for later use.

Mode select unit 43 may select a mode from the first set and/or the second set of intra-prediction modes, which intra-prediction unit 46 may use to intra-code the current block (128). For instance, mode select unit 43 may select a best mode from the first and second sets that is associated with the lowest approximate cost. Upon selecting the mode, mode select unit 43 may send data to intra-prediction unit 46 that specifies the selected mode.

Using the mode received from mode select unit 43, intra-prediction unit 46 may perform intra-prediction performing intra-prediction to encode the current block in accordance with selected mode, as further described in example of FIG. 2 (130). In this way, the intra-prediction is based on the approximate cost computed for each intra-prediction mode identified in the first set of intra-prediction modes and the second set of intra-prediction modes from which the best mode was selected by mode select unit 43.

Figure 6:
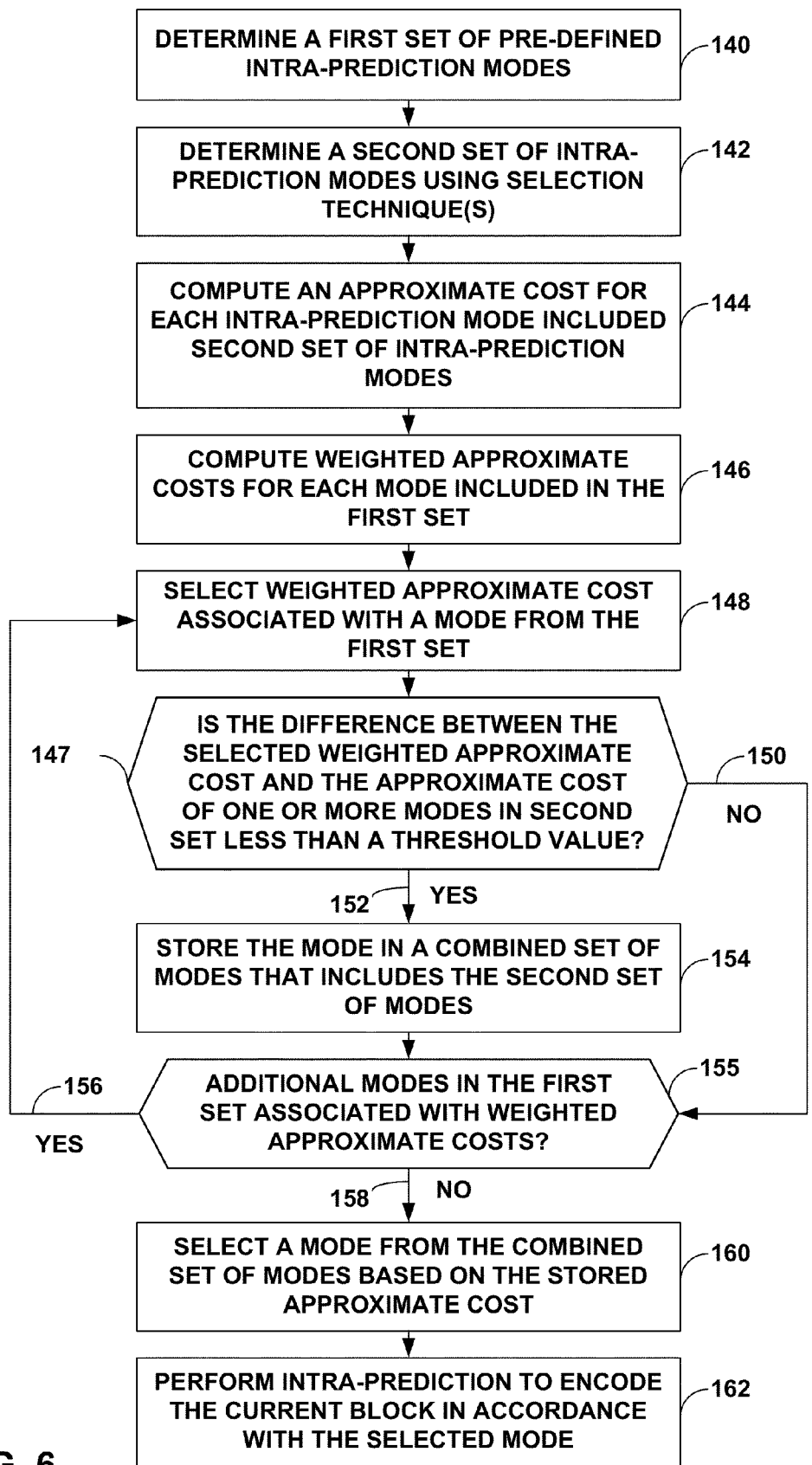
FIG. 6 is a flowchart illustrating exemplary operation of a video coder, such as the video encoder as shown in FIG. 2, in performing aspects of reducing the space required to store rate distortion values when selecting from multiple, different prediction modes, in accordance with techniques of the disclosure.

FIG. 6 is a flowchart illustrating exemplary operation of a video coder, such as video encoder 20 shown in FIG. 2, in performing aspects of reducing the space required to store rate distortion values when selecting from multiple, different prediction modes, in accordance with techniques of the disclosure. In some examples, video encoder 20 may store, for each PU, distortion measures, such as approximate costs, associated with M pre-defined intra prediction modes. In some examples, video encoder 20 may then, using one or more selection techniques described herein, select N modes out of the remaining possible modes based on the distortion measures to form a subset. Video encoder 20 may then compare the distortion measures of these N modes with weighted distortion measures of M pre-defined modes. The weighting factor may be smaller than 1 and larger than 0, so if a difference between the distortion measure of a given pre-defined mode and the respective distortion measures of those N modes is less than a threshold value (i.e., the distortion measure of the given pre-defined mode is not too much larger than those distortion measures of the N modes), video encoder 20 may select the given pre-defined mode and add it into the combined subset of modes from which video encoder 20 will later select a best mode to intra-predict the current block. In this way, video encoder 20 may store a total number of T modes in the combined subset of modes, where T is equal to one of or between N to N+M. Video encoder 20 may then select, a "best" mode from the subset using Lagrange multipliers based on available rate information. For instance, video encoder 20 may select the "best" mode from the subset as the mode with the lowest approximate cost. Reference is now made to the flowchart of FIG. 6 to further illustrate these example techniques.

Initially, referring first to video encoder 20, prediction unit 41 may receive a one or more video blocks of video data for encoding. In response to determining a current block to be coded, mode select unit 43 may determine a first set of intra-prediction modes for the current block of the video data to be encoded, as described above (140). In some examples, the first set of intra-prediction modes includes a pre-defined group of intra-prediction modes. The pre-defined group of intra-prediction modes may include intra-prediction modes that have been statistically identified as occurring on a more frequent basis than the remaining ones of the intra-prediction modes. In some examples, the first set of intra-prediction modes includes less intra-prediction modes than a total number of intra-prediction modes capable of being used to encode the current block.

Mode select unit 43 may next determine a second set of intra-prediction modes for the current block in addition to the first predefined set of intra-prediction modes (142). As described in FIG. 2, mode select unit 43 may implement one or more selection techniques, such as random selection, sampling selection, etc., to select one or more intra-prediction modes. The second set of intra-prediction modes may include fewer intra-prediction modes than the total number of intra-prediction modes capable of being used to encode the current block. Moreover, both the first set and the second set may collectively include less intra-prediction modes in total than the total number of intra-prediction modes capable of being used to encode the current block.

Mode select unit 43, in some examples, then computes an approximate cost for each intra-prediction mode included in the second set of intra-prediction modes (144). As described in FIG. 2, an approximate cost may approximate a rate distortion cost of encoding the current block of video data using the corresponding one of the intra-prediction modes. Mode select unit 43 may implement one or more example cost approximation techniques using one or more distortion measures, such as sum of squared distortion (SSD), a sum of absolute difference (SAD) and a sum of absolute transform differences (SATD).

Mode select unit 43, in some examples, then computes a weighted approximate cost for each intra-prediction mode included in the first set of intra-prediction modes (146). That is, mode select unit 43 may apply a weight to each of the approximate costs computed for each intra-prediction mode identified in the first predefined set of intra-prediction modes to compute weighted approximate costs for each intra-prediction mode identified in the first set of intra-prediction modes. For instance, mode select unit 43 may determine a weighting factor that is based at least in part on an average of two or more modes having the lowest costs in the first set of intra-prediction modes. That is, mode select unit 43 may apply a larger weighting factor when the average is larger and a smaller weighting factor when the average is smaller. The magnitude of the weighting factor may be proportional to the average of the two or more modes. In other examples, the variance of the costs of two or more modes in the first set of intra-prediction modes may be similarly used. In some examples, the weighting factor may be included in within a range of 0-1, although any suitable range of continuous and/or discrete values is possible. As one example, to apply the weighting factor, mode select unit 43 may generate the weighted approximate cost for a given intra-prediction mode as a product of the weighting factor and the approximate cost for the given intra-prediction mode. In other examples, mode select unit 43 may generate the weighted approximate cost for a given intra-prediction mode as a sum of the weighting factor and the approximate cost for the given intra-prediction mode.

Mode select unit 43 may next select a weighted approximate cost associated with a given mode from the first set (148). Upon selecting the weighted approximate cost, mode select unit 43 may determine whether a difference between the weighted approximate cost and an approximate cost of a mode in the second set is less than a threshold value (147). That is, mode select unit 43 may compare the weighted approximate cost to each of the approximate costs computed for each intra-prediction mode identified in the second set of intra-prediction modes. In some examples, mode select unit 43 may determine whether the difference between the weighted approximate cost and approximate costs of multiple modes in the second set is less than a threshold value. For instance, mode select unit 43 may determine an average of multiple approximate costs in the second set or any other suitable computed value based on multiple approximate costs.

In any case, if the difference between the weighted approximate cost and the approximate cost of the second set is less than a threshold value (152), mode select unit 43 may store the mode in a combined set of modes that includes at least the selected mode and one or more modes of the second set (154). Mode select unit 43 may also store the approximate cost value associated with the mode. Alternatively, if the difference between the weighted approximate cost and the approximate cost of the second set is not less than a threshold value (150), mode select unit 43 may not store the mode in the combined set of modes. That is, mode prediction unit 43 may store the approximate costs computed for intra-prediction modes identified in the first predefined set of intra-prediction modes to the memory based on the comparison described above and illustrated at (147). In some examples, mode select unit 43 may determine whether any additional modes in the first set associated with weighted approximate costs exist that have not yet been evaluated by mode select unit 43 (155).

If additional unevaluated modes exist in the first set, mode select unit 43 may select the next unevaluated (156) and subsequent evaluate the select mode (148). Alternatively, if mode select unit 43 has evaluated each mode in the first set (158), mode select unit 43 may next select a mode from the combined set of modes based on the approximate cost values associated with the modes (160). In some examples, mode select unit 43 may select a mode associated with the lowest cost value. Upon receiving an indication of the selected mode from mode select unit 43, intra-prediction unit 46 may perform intra-prediction to encode the current block in accordance with the selected mode (162).

Figure 7:
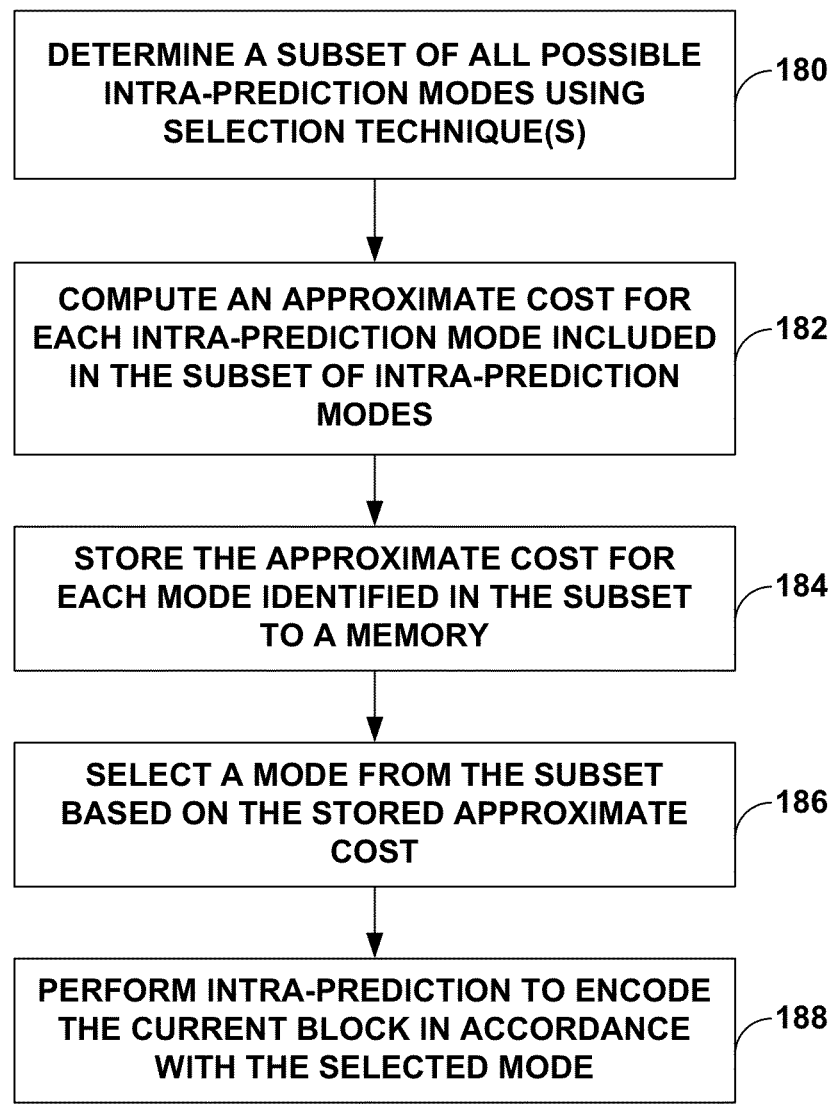
FIG. 7 is a flowchart illustrating exemplary operation of a video coder, such as the video encoder as shown in FIG. 2, in performing aspects of reducing the space required to store rate distortion values when selecting from multiple, different prediction modes, in accordance with techniques of the disclosure.

FIG. 7 is a flowchart illustrating exemplary operation of a video coder, such as video encoder 20 shown in FIG. 2, in performing aspects of reducing the space required to store rate distortion values when selecting from multiple, different prediction modes, in accordance with techniques of the disclosure. In some examples, video encoder 20 may, select, for each PU, only the best N modes (in term of distortion measure D alone without rate R) to form a subset, and mode select unit 43 may store the corresponding distortion measures. That is, in some instances, mode select unit 43 may determine a first predefined set of intra-prediction modes that comprise a null or empty set of intra-prediction modes, meaning that only a second set of intra-prediction modes is tested with the rate-distortion analysis. This may further reduce on-chip memory requirements for the video encoder. Mode select unit 43 may select a best mode from the subset using Lagrange multipliers when rate information is available. For instance, video encoder 20 may select the "best" mode from the subset as the mode with the lowest approximate cost. Reference is now made to the flowchart of FIG. 7 to further illustrate these example techniques.

Initially, mode select unit 43 may determine a subset of all possible intra-prediction modes using one or more selection techniques (180). For instance, as described in FIG. 2, mode select unit 43 may implement one or more selection techniques, such as random selection, sampling selection, etc., to select one or more intra-prediction modes. In some examples, mode select unit 43 may select a quantity of modes that is less than a threshold value. In other examples, mode select unit 43 may select a quantity of modes that is greater than a threshold value.

Mode select unit 43 may next compute an approximate cost for each intra-prediction mode included in the subset of intra-prediction modes (182). As previously described in this disclosure, mode select unit 43 may implement one or more example cost approximation techniques, using one or more distortion measures such as sum of squared distortion (SSD), a sum of absolute difference (SAD) and a sum of absolute transform differences (SATD). Mode select unit may use one or more example cost approximation techniques to compute each approximate cost.

Mode select unit 43 may then store the approximate cost for each intra-prediction mode identified in the subset to a memory (184). The memory may be in on-chip memory (e.g., registers, on-chip caches, etc.) that is included in or integrated with a microprocessor that implements video encoder 20. The approximate costs for the intra-prediction modes included in the subset may therefore be retrievable by video encoder 20 for later use.

Mode select unit 43 may select a mode from the subset of intra-prediction modes, which intra-prediction unit 46 may use to intra-code the current block (186). For instance, mode select unit 43 may select a best mode from the first and second sets that is associated with the lowest approximate cost. Upon selecting the mode, mode select unit 43 may send data to intra-prediction unit 46 that specifies the selected mode.

Using the mode received from mode select unit 43, intra-prediction unit 46 may perform intra-prediction performing intra-prediction to encode the current block in accordance with selected mode, as further described in example of FIG. 2 (188). In this way, the intra-prediction is based on the approximate cost computed for each intra-prediction mode identified in the subset of intra-prediction modes from which the best mode was selected by mode select unit 43.

Figure 8:
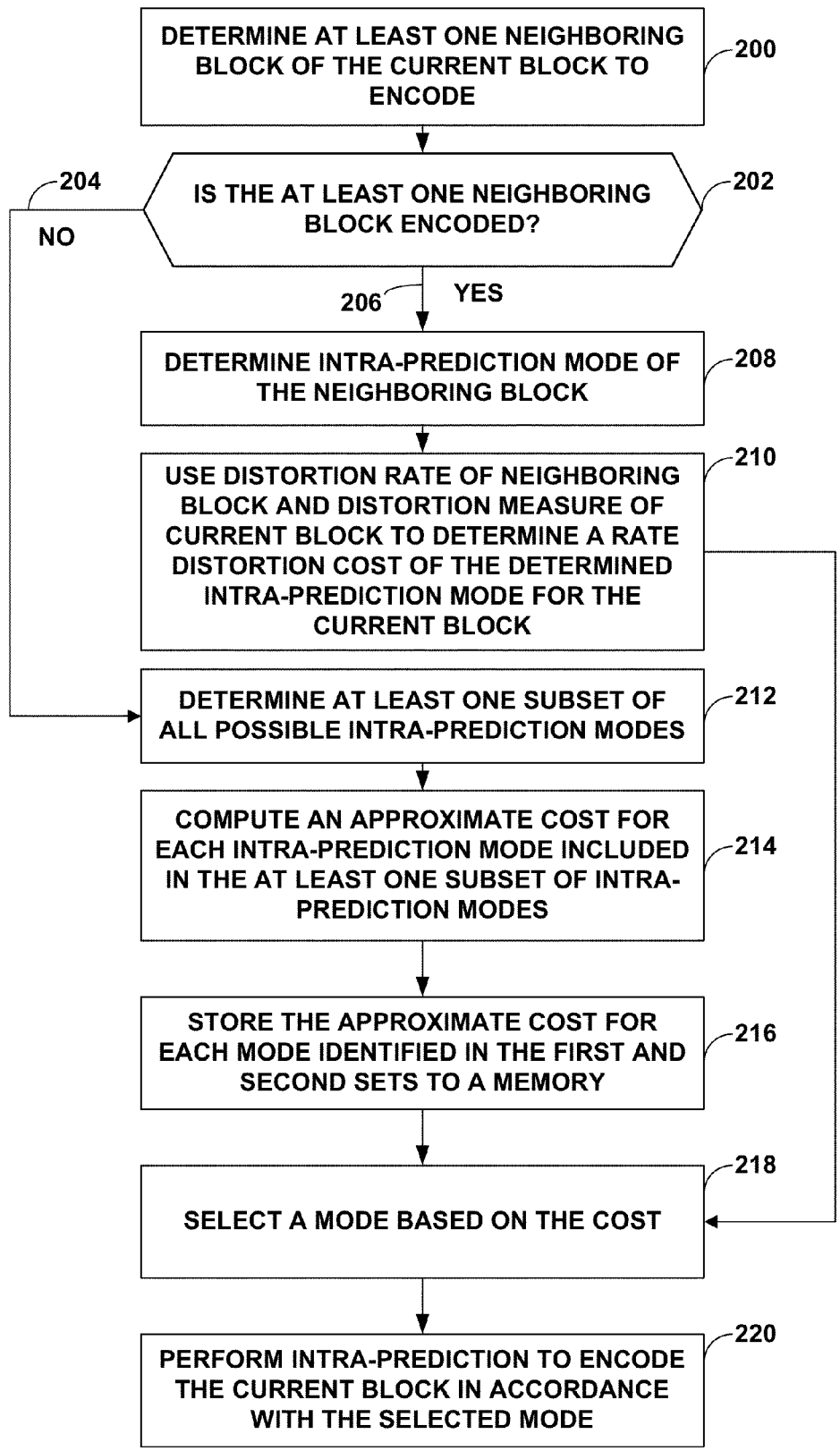
FIG. 8 is a flowchart illustrating exemplary operation of a video coder, such as the video encoder as shown in FIG. 2, in performing aspects of reducing the space required to store rate distortion values when selecting from multiple, different prediction modes, in accordance with techniques of the disclosure.

FIG. 8 is a flowchart illustrating exemplary operation of a video coder, such as video encoder 20 shown in FIG. 2, in performing aspects of reducing the space required to store rate distortion values when selecting from multiple, different prediction modes, in accordance with techniques of the disclosure. In certain examples, for some PUs, video encoder 20 may have already encoded some of the neighboring blocks of the current block. Video encoder 20 may be highly parallel, meaning that the video encoder may be encoding the neighboring blocks concurrently with performing this intra-prediction. Video encoder 20 may therefore utilize the information of the neighboring blocks together with the distortion measure of the current block to improve the estimation of the cost of a given mode. For example, if a current block is on an LCU boundary, its neighboring blocks may be encoded and some or all of the information for the neighboring blocks may therefore be available. Since the intra modes of the neighboring blocks are known, video encoder 20 may estimate the distortion rate more accurately using information of the neighboring blocks and obtain the Lagrange multiplier cost for each mode with respect to the current block. For other blocks whose neighboring blocks are not fully encoded and reconstructed, such as those inside the LCU that includes the current block, video decoder 20 may revert to using one or more techniques previously described in FIGS. 1-7 to select a mode to intra-predict the current block.

In this way, the determination of the first set of intra-prediction modes, the determination of the second set of intra-prediction modes, the computation of the approximate costs for each intra-prediction mode identified in the first set of intra-prediction modes and each intra-prediction mode identified in the second set of intra-prediction modes and the storage of the approximate costs may occur dynamically based on whether intra-prediction modes used to encode neighboring blocks of video data adjacent to the current block are available for use in determining most probable intra-prediction modes for the current block. Reference is now made to the flowchart of FIG. 8 to further illustrate these example techniques.

Initially, mode select unit 43 may determine at least one neighboring block of the current block to be encoded (200). For instance, the current block may be along a vertical block boundary of an adjacent LCU that includes the at least one neighboring block. In another example, the current block may be along a horizontal block boundary of an adjacent LCU that includes the at least one neighboring block. In any case, upon determining the at least one neighboring block, mode select unit 43 may determine whether the at least one neighboring block has already been encoded (202).

If the neighboring block has already been encoded (206), mode select unit 43 may determine an intra-prediction mode of the neighboring block (208). Mode select unit 43 may determine the distortion rate (e.g., R as described in FIG. 2) for the current block to be equal to an estimate of the distortion rate of the neighboring block or the actual distortion rate value of the neighboring block. Based on the distortion measure of the current block (e.g., D as described in FIG. 2) and the distortion rate of the neighboring block, mode select unit 43 may determine cost of the selected mode for the current block (210). That is, mode select unit 43 may determine a cost for the current block based on the mode and distortion rate of the neighboring block, and the distortion measure of the current block.

In some examples mode select unit 43 may determine the cost for each mode of multiple neighboring blocks. In other examples mode select unit 43 may determine the cost of the current block using the mode actually applied by mode select unit 43 to encode the neighboring block. In any case, mode select unit 43 store the one or more modes based on information of the neighboring blocks in a subset of all possible intra-prediction modes. In some examples, the sub-set may also include one or more pre-defined intra-prediction modes and/or one or more modes determined using selection techniques described herein. Mode select unit 43 may then select a mode for the current block based on the costs of the one or more modes determined by mode select unit 43 (218). In some examples, mode select unit 43 may select a mode associated with the lowest cost value. Upon receiving an indication of the selected mode from mode select unit 43, intra-prediction unit 46 may perform intra-prediction to encode the current block in accordance with the selected mode (220).

Returning the operation (202), if mode select unit 43 determines that the at least one neighboring block is not encoded (204), mode select unit 43 may revert to using one or more techniques described in the examples of FIGS. 1-7 to select the best mode to intra-predict the current block. For example, mode select unit 43 may determine at least one subset of all the possible intra-prediction modes. For instance, the at least one subset may include one or more pre-defined modes. In other examples, the subset may include one or more modes selected by mode select unit 43 using selection techniques previously described herein. In still other examples, mode select unit 43 may determine two subsets of prediction modes that respectively include pre-defined modes and modes selected using one or more selection techniques (212).

In any case, mode select unit 43 may next determine approximate costs for each intra-prediction mode included in the at least one sub-set of intra-prediction modes (214). Mode select unit 43 may implement one or more example cost approximation techniques, using one or more distortion measures such as sum of squared distortion (SSD), a sum of absolute difference (SAD) and a sum of absolute transform differences (SATD). Upon determining approximate cost values, mode select unit 43 may then store the approximate cost for each intra-prediction mode identified in the at least one subset of all possible intra-prediction modes to a memory (216). The memory may be in on-chip memory (e.g., registers, on-chip caches, etc.) that is included in or integrated with a microprocessor that implements video encoder 20. The approximate costs for the intra-prediction modes included in the first and second sets may therefore be retrievable by video encoder 20 for later use.

Mode select unit 43 may select a mode from the at least one subset set of intra-prediction modes, which intra-prediction unit 46 may use to intra-code the current block (218). For instance, mode select unit 43 may select a best mode from the first and second sets that is associated with the lowest approximate cost. Upon selecting the mode, mode select unit 43 may send data to intra-prediction unit 46 that specifies the selected mode.

Using the mode received from mode select unit 43, intra-prediction unit 46 may perform intra-prediction performing intra-prediction to encode the current block in accordance with selected mode, as further described in example of FIG. 2 (220). In this way, the intra-prediction is based on the approximate cost computed for each intra-prediction mode identified in the first set of intra-prediction modes and the second set of intra-prediction modes from which the best mode was selected by mode select unit 43.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of encoding video data by a computing device, the method comprising:

while concurrently performing either intra-prediction or inter-prediction with respect to one or more neighboring blocks of the video data that are adjacent to a current block:
  determining a first set of pre-defined intra-prediction modes for the current block of the video data to be encoded, wherein the first set of intra-prediction modes includes less intra-prediction modes than a total number of intra-prediction modes capable of being used to encode the current block;
  determining a second set of intra-prediction modes for the current block in addition to the first predefined set of intra-prediction modes, wherein the second set of intra-prediction modes is not pre-defined and includes a quantity of intra-prediction modes less than or equal to the total number of intra-prediction modes capable of being used to encode the current block, wherein both the first set and the second set collectively include less intra-prediction modes in total than the total number of intra-prediction modes capable of being used to encode the current block;
  computing an approximate cost that approximates a full rate distortion cost for each intra-prediction mode included in the first set of intra-prediction modes and each intra-prediction mode included in the second set of intra-prediction modes, wherein the approximate cost approximates a rate distortion cost of encoding the current block of video data using the corresponding one of the intra-prediction modes;
  storing, for performing intra-prediction using full rate distortion optimization, the approximate cost only for each intra-prediction mode identified in the first set of intra-prediction modes and for each intra-prediction mode identified in the second set of intra-prediction modes to a memory; and
  performing intra-prediction using full rate distortion optimization to encode the current block in accordance with one of the intra-prediction modes identified by the first set of intra-prediction modes or the second set of intra-prediction modes based on the approximate cost computed for each intra-prediction mode identified in the first set of intra-prediction modes and the second set of intra-prediction modes.

2. The method of claim 1, wherein storing the approximate cost only for each intra-prediction mode identified in the first set of intra-prediction modes and each intra-prediction mode identified in the second set of intra-prediction modes comprises:
  applying a weight to each of the approximate costs computed for each intra-prediction mode identified in the first predefined set of intra-prediction modes to compute weighted approximate costs for each intra-prediction mode identified in the first set of intra-prediction modes;
  comparing the weighted approximate costs to each of the approximate costs computed for each intra-prediction mode identified in the second set of intra-prediction modes; and
  storing the approximate costs computed for intra-prediction modes identified in the first predefined set of intra-prediction modes to the memory based on the comparison.

3. The method of claim 2, wherein comparing the weighted approximate costs to each of the approximate costs computed for each intra-predicted mode identified in the second set of intra-prediction modes, further comprises:
  selecting a weighted approximate cost from the weighted approximate costs;
  determining a difference between the weighted approximate cost and an approximate cost of the approximate costs computed for each intra-predicted mode; and
  determining that the difference is less than a threshold value.

4. The method of claim 1, wherein determining the first set of intra-prediction modes comprising determining a null set of intra-prediction modes.

5. The method of claim 1, wherein at least one of:
  the determination of the first set of intra-prediction modes,
  the determination of the second set of intra-prediction modes,
  the computation of the approximate costs for each intra-prediction mode identified in the first set of intra-prediction modes and each intra-prediction mode identified in the second set of intra-prediction modes, and
  the storage of the approximate costs,
  occurs dynamically based at least in part on whether intra-prediction modes used to encode neighboring blocks of video data adjacent to the current block are available for use in determining most probable intra-prediction modes for the current block.

6. The method of claim 5, further comprising:
  determining a neighboring block of the current block;
  in response to determining that the neighboring block is encoded, determining the intra-prediction mode of the neighboring block; and
  determining a rate distortion cost for the current block based at least in part on the intra-prediction mode of the neighboring block.

7. The method of claim 1, wherein determining the first set of intra-prediction modes for the current block of the video data to be encoded comprises determining a first pre-defined set of intra-prediction modes for the current block of the video data to be encoded.

8. The method of claim 1, further comprising:
  generating at least one statistic that indicates a quantity of occurrences that an intra-prediction mode was previously selected to encode previously-predicted blocks; and
  in response to determining that the quantity of occurrences is greater than a threshold value, including the intra-prediction mode in the second set of intra-prediction modes.

9. The method of claim 1, wherein performing intra-prediction to encode the current block further comprises:
  determining an approximate cost associated with an intra-prediction modes, wherein the determined approximate cost has a lowest approximate cost of the approximate costs; and
  intra-predicting the current block using a mode associated with the determined approximate cost that has the lowest approximate cost.

10. A video coding device configured to perform an intra-prediction process to code video data, the video coding device comprising:
  a processor configured to, while concurrently performing either intra-prediction or inter-prediction with respect to one or more neighboring blocks of the video data that are adjacent to a current block:
    determine a first set of pre-defined intra-prediction modes for the current block of the video data to be encoded, wherein the first set of intra-prediction modes includes less intra-prediction modes than a total number of intra-prediction modes capable of being used to encode the current block;

determine a second set of intra-prediction modes for the current block in addition to the first predefined set of intra-prediction modes, wherein the second set of intra-prediction modes is not pre-defined and includes a quantity of intra-prediction modes less than or equal to the total number of intra-prediction modes capable of being used to encode the current block, wherein both the first set and the second set collectively include less intra-prediction modes in total than the total number of intra-prediction modes capable of being used to encode the current block;

compute an approximate cost that approximates a full rate distortion cost for each intra-prediction mode included in the first set of intra-prediction modes and each intra-prediction mode included in the second set of intra-prediction modes, wherein the approximate cost approximates a rate distortion cost of encoding the current block of video data using the corresponding one of the intra-prediction modes;

store, for performing intra-prediction using full rate distortion optimization, the approximate cost for each intra-prediction mode identified in the first set of intra-prediction modes and for each intra-prediction mode identified in the second set of intra-prediction modes to a memory; and perform intra-prediction using full rate distortion optimization to encode the current block in accordance with one of the intra-prediction modes identified by the first set of intra-prediction modes or the second set of intra-prediction modes based on the approximate cost computed for each intra-prediction mode identified in the first set of intra-prediction modes and the second set of intra-prediction modes.

11. The video coding device of claim 10, wherein the processor is further configured to:

apply a weight to each of the approximate costs computed for each intra prediction mode identified in the first predefined set of intra-prediction modes to compute weighted approximate costs for each intra-prediction mode identified in the first set of intra-prediction modes;

compare the weighted approximate costs to each of the approximate costs computed for each intra-prediction mode identified in the second set of intra-prediction modes; and store the approximate costs computed for intra-prediction modes identified in the first predefined set of intra-prediction modes to the memory based on the comparison.

12. The video coding device of claim 11, wherein the processor is further configured to:

select a weighted approximate cost from the weighted approximate costs;

determine a difference between the weighted approximate cost and an approximate cost of the approximate costs computed for each intra-predicted mode; and determine that the difference is less than a threshold value.

13. The video coding device of claim 10, wherein the processor is further configured to determine a null set of intra-prediction modes.

14. The video coding device of claim 10, wherein at least one of:

the determination of the first set of intra-prediction modes, the determination of the second set of intra-prediction modes, the computation of the approximate costs for each intra-prediction mode identified in the first set of intra-prediction modes and each intra-prediction mode identified in the second set of intra-prediction modes, and the storage of the approximate costs, occurs dynamically based at least in part on whether intra-prediction modes used to encode neighboring blocks of video data adjacent to the current block are available for use in determining most probable intra-prediction modes for the current block.

15. The video coding device of claim 14, wherein the processor is further configured to:

determine a neighboring block of the current block;

in response to determining that the neighboring block is encoded, determine the intra-prediction mode of the neighboring block; and determine a rate distortion cost for the current block based at least in part on the intra-prediction mode of the neighboring block.

16. The video coding device of claim 10, wherein the processor is further configured to determine a first pre-defined set of intra-prediction modes for the current block of the video data to be encoded.

17. The video coding device of claim 10, wherein the processor is further configured to:

generate at least one statistic that indicates a quantity of occurrences that an intra-prediction mode was previously selected to encode previously-predicted blocks; and in response to determining that the quantity of occurrences is greater than a threshold value, include the intra-prediction mode in the second set of intra-prediction modes.

18. The video coding device of claim 10, wherein the processor is further configured to:

determine an approximate cost associated with an intra-prediction modes, wherein the determined approximate cost has a lowest approximate cost of the approximate costs; and intra-predict the current block using a mode associated with the determined approximate cost that has the lowest approximate cost.

19. A video coding device configured to, while concurrently performing either intra-prediction or inter-prediction with respect to one or more neighboring blocks of the video data that are adjacent to a current block, perform an intra-prediction process to code video data, the video coding device comprising:

means for determining a first set of pre-defined intra-prediction modes for the current block of the video data to be encoded, wherein the first set of intra-prediction modes includes less intra-prediction modes than a total number of intra-prediction modes capable of being used to encode the current block;

means for determining a second set of intra-prediction modes for the current block in addition to the first pre-defined set of intra-prediction modes, wherein the second set of intra-prediction modes is not pre-defined and includes a quantity of intra-prediction modes less than or equal to the total number of intra-prediction modes capable of being used to encode the current block, wherein both the first set and the second set collectively include less intra-prediction modes in total than the total number of intra-prediction modes capable of being used to encode the current block;

means for computing an approximate cost that approximates a full rate distortion cost for each intra-prediction mode included in the first set of intra-prediction modes and each intra-prediction mode included in the second set of intra-prediction modes, wherein the approximate cost approximates a rate distortion cost of encoding the current block of video data using the corresponding one of the intra-prediction modes;

means for storing, for performing intra-prediction using full rate distortion optimization, the approximate cost only for each intra-prediction mode identified in the first set of intra-prediction modes and for each intra-prediction mode identified in the second set of intra-prediction modes to a memory; and means for performing intra-prediction using full rate distortion optimization to encode the current block in accordance with one of the intra-prediction modes identified by the first set of intra-prediction modes or the second set of intra-prediction modes based on the approximate cost computed for each intra-prediction mode identified in the first set of intra-prediction modes and the second set of intra-prediction modes.

20. The video coding device of claim 19, further comprising:

means for applying a weight to each of the approximate costs computed for each intra-prediction mode identified in the first predefined set of intra-prediction modes to compute weighted approximate costs for each intra-prediction mode identified in the first set of intra-prediction modes;

means for comparing the weighted approximate costs to each of the approximate costs computed for each intra-prediction mode identified in the second set of intra-prediction modes; and means for storing the approximate costs computed for intra-prediction modes identified in the first predefined set of intra-prediction modes to the memory based on the comparison.

21. The video coding device of claim 20, further comprising:

means for selecting a weighted approximate cost from the weighted approximate costs;

means for determining a difference between the weighted approximate cost and an approximate cost of the approximate costs computed for each intra-predicted mode; and means for determining that the difference is less than a threshold value.

22. The video coding device of claim 19, further comprising means for determining a null set of intra-prediction modes.

23. The video coding device of claim 19, wherein at least one of:

the determination of the first set of intra-prediction modes,
the determination of the second set of intra-prediction modes,
the computation of the approximate costs for each intra-prediction mode identified in the first set of intra-prediction modes and each intra-prediction mode identified in the second set of intra-prediction modes, and
the storage of the approximate costs,
occurs dynamically based at least in part on whether intra-prediction modes used to encode neighboring blocks of video data adjacent to the current block are available for use in determining most probable intra-prediction modes for the current block.

24. The video coding device of claim 23, further comprising:

means for determining a neighboring block of the current block;
means for determining the intra-prediction mode of the neighboring block, in response to determining that the neighboring block is encoded; and means for determining a rate distortion cost for the current block based at least in part on the intra-prediction mode of the neighboring block.

25. The video coding device of claim 19, further comprising means for determining a first pre-defined set of intra-prediction modes for the current block of the video data to be encoded.

26. The video coding device of claim 19, further comprising:

means for generating at least one statistic that indicates a quantity of occurrences that an intra-prediction mode was previously selected to encode previously-predicted blocks; and means for including the intra-prediction mode in the second set of intra-prediction modes, in response to determining that the quantity of occurrences is greater than a threshold value.

27. The video coding device of claim 19, further comprising:

means for determining an approximate cost associated with an intra-prediction modes, wherein the determined approximate cost has a lowest approximate cost of the approximate costs; and means for intra-predicting the current block using a mode associated with the determined approximate cost that has the lowest approximate cost.

28. A non-transitory computer-readable storage medium having instruction stored thereon that, when executed, cause one or more processors to, while concurrently performing either intra-prediction or inter-prediction with respect to one or more neighboring blocks of the video data that are adjacent to a current block:

determine a first set of pre-defined intra-prediction modes for the current block of the video data to be encoded, wherein the first set of intra-prediction modes includes less intra-prediction modes than a total number of intra-prediction modes capable of being used to encode the current block;

determine a second set of intra-prediction modes for the current block in addition to the first predefined set of intra-prediction modes, wherein the second set of intra-prediction modes is not pre-defined and includes a quantity of intra-prediction modes less than or equal to the total number of intra-prediction modes capable of being used to encode the current block, wherein both the first set and the second set collectively include less intra-prediction modes in total than the total number of intra-prediction modes capable of being used to encode the current block;

compute an approximate cost that approximates a full rate distortion cost for each intra-prediction mode included in the first set of intra-prediction modes and each intra-prediction mode included in the second set of intra-prediction modes, wherein the approximate cost approximates a rate distortion cost of encoding the current block of video data using the corresponding one of the intra-prediction modes;

store, for performing intra-prediction using full rate distortion optimization, the approximate cost only for each intra-prediction mode identified in the first set of intra-prediction modes and for each intra-prediction mode identified in the second set of intra-prediction modes to a memory; and perform using full rate distortion optimization intra-prediction to encode the current block in accordance with one of the intra-prediction modes identified by the first set of intra-prediction modes or the second set of intraprediction modes based on the approximate cost computed for each intra-prediction mode identified in the first set of intra-prediction modes and the second set of intra-prediction modes.

29. The non-transitory computer-readable storage medium of claim 28, wherein the instructions, when executed, cause the one or more processors to:
apply a weight to each of the approximate costs computed for each intra-prediction mode identified in the first predefined set of intra-prediction modes to compute weighted approximate costs for each intra-prediction mode identified in the first set of intra-prediction modes;
compare the weighted approximate costs to each of the approximate costs computed for each intra-prediction mode identified in the second set of intra-prediction modes; and
store the approximate costs computed for intra-prediction modes identified in the first predefined set of intra-prediction modes to the memory based on the comparison.

30. The non-transitory computer-readable storage medium of claim 29, wherein the instructions, when executed, cause the one or more processors to:
select a weighted approximate cost from the weighted approximate costs;
determine a difference between the weighted approximate cost and an approximate cost of the approximate costs computed for each intra-predicted mode; and
determine that the difference is less than a threshold value.

31. The non-transitory computer-readable storage medium of claim 28, wherein the instructions, when executed, cause the one or more processors to determine a null set of intra-prediction modes.

32. The non-transitory computer-readable storage medium of claim 28, wherein at least one of:
the determination of the first set of intra-prediction modes,
the determination of the second set of intra-prediction modes,
the computation of the approximate costs for each intra-prediction mode identified in the first set of intra-prediction modes and each intra-prediction mode identified in the second set of intra-prediction modes, and
the storage of the approximate costs,
occurs dynamically based at least in part on whether intra-prediction modes used to encode neighboring blocks of video data adjacent to the current block are available for use in determining most probable intra-prediction modes for the current block.

33. The non-transitory computer-readable storage medium of claim 32, wherein the instructions, when executed, cause the one or more processors to:
determine a neighboring block of the current block;
in response to determining that the neighboring block is encoded, determine the intra-prediction mode of the neighboring block; and
determine a rate distortion cost for the current block based at least in part on the intra-prediction mode of the neighboring block.

34. The non-transitory computer-readable storage medium of claim 28, wherein the instructions, when executed, cause the one or more processors to determine a first pre-defined set of intra-prediction modes for the current block of the video data to be encoded.

35. The non-transitory computer-readable storage medium of claim 28, wherein the instructions, when executed, cause the one or more processors to:
generate at least one statistic that indicates a quantity of occurrences that an intra-prediction mode was previously selected to encode previously-predicted blocks; and
in response to determining that the quantity of occurrences is greater than a threshold value, include the intra-prediction mode in the second set of intra-prediction modes.

36. The non-transitory computer-readable storage medium of claim 28, wherein the instructions, when executed, cause the one or more processors to:
determine an approximate cost associated with an intra-prediction modes, wherein the determined approximate cost has a lowest approximate cost of the approximate costs; and
intra-predict the current block using a mode associated with the determined approximate cost that has the lowest approximate cost.

* * * * *